United States Patent
Kameta

(10) Patent No.: US 11,494,858 B2
(45) Date of Patent: Nov. 8, 2022

(54) REAL ESTATE MANAGEMENT SYSTEM, METHOD, AND PROGRAM

(71) Applicant: ZWEISPACE JAPAN CORP., Tokyo (JP)

(72) Inventor: Hayato Kameta, Tokyo (JP)

(73) Assignee: ZWEISPACE JAPAN CORP., Tokyo (JP)

(*) Notice: Subject to any disclaimer, the term of this patent is extended or adjusted under 35 U.S.C. 154(b) by 844 days.

(21) Appl. No.: 16/328,283

(22) PCT Filed: Aug. 31, 2017

(86) PCT No.: PCT/JP2017/031377
§ 371 (c)(1),
(2) Date: Feb. 26, 2019

(87) PCT Pub. No.: WO2018/043647
PCT Pub. Date: Mar. 8, 2018

(65) Prior Publication Data
US 2020/0193538 A1  Jun. 18, 2020

(30) Foreign Application Priority Data
Aug. 31, 2016 (JP) .............................. JP2016-169002

(51) Int. Cl.
*G06Q 50/16* (2012.01)
*H04L 9/06* (2006.01)
(Continued)

(52) U.S. Cl.
CPC ......... *G06Q 50/163* (2013.01); *H04L 9/0643* (2013.01); *H04L 9/3247* (2013.01); *H04N 7/183* (2013.01); *H04L 9/50* (2022.05)

(58) Field of Classification Search
CPC .............................. G06Q 50/16; G06Q 50/163
See application file for complete search history.

(56) References Cited

U.S. PATENT DOCUMENTS 11,145,016 B1* 10/2021 Brophy .............. G06Q 30/0645
2005/0096996 A1* 5/2005 Hall ........................ G06Q 50/16
705/67
(Continued)

FOREIGN PATENT DOCUMENTS

CN 101958817 A 1/2011
JP 2002-007541 A 1/2002
(Continued)

OTHER PUBLICATIONS

Extended European Search Report dated Dec. 19, 2019.
(Continued)

*Primary Examiner* — Maria C Santos-Diaz
(74) *Attorney, Agent, or Firm* — Yokoi & Co., U.S.A.; Toshiyuki Yokoi

(57) ABSTRACT

To achieve a balance between convenience in managing/handling real estate properties and privacy protection of tenants while reducing the facility cost and operating cost. A real estate management system is equipped with: a camera robot 61 for capturing an interior image of a real estate property 3; a tenant side device 41 for controlling communications with the camera robot 61; an operation regulation unit 402c for regulating operation of the tenant side device 41 on the basis of an operation performed by a tenant of the real estate property 3; a communication service provider side device 7 connected to the camera robot 61 over a communication network and controlling a communication service using the camera robot 61; and a real estate manager side device 8 connected to the camera robot 61 over the communication network and executing a real estate management service using the camera robot 61. The communication service provider side device 7 and the real estate manager side device 8 are permitted to connect to the camera robot 61 on the basis of an authentication result of a device side authentication unit 402b and an approval operation performed by the tenant.

24 Claims, 12 Drawing Sheets

(51) Int. Cl.
*H04L 9/32* (2006.01)
*H04N 7/18* (2006.01)
*H04L 9/00* (2022.01)

(56) References Cited

U.S. PATENT DOCUMENTS

| | | | |
|---|---|---|---|
| 2007/0120965 A1 | 5/2007 | Sandberg et al. | |
| 2011/0040692 A1* | 2/2011 | Ahroon | G06Q 99/00 705/500 |
| 2015/0186953 A1* | 7/2015 | Gross | G06Q 50/16 705/14.58 |
| 2015/0269151 A1* | 9/2015 | Wallace | G06Q 50/163 705/314 |
| 2017/0337647 A1* | 11/2017 | Vaynshteyn | G06Q 50/18 |
| 2018/0005143 A1* | 1/2018 | Camargo | G07C 9/00174 |
| 2021/0407023 A1* | 12/2021 | Brophy | G06Q 50/163 |

FOREIGN PATENT DOCUMENTS

| | | |
|---|---|---|
| JP | 2006-217444 A | 8/2006 |
| JP | 2008-066893 A | 3/2008 |
| JP | 2010-198375 A | 9/2010 |
| JP | 2015-033042 A | 2/2015 |
| JP | 5963155 B | 8/2016 |
| KR | 2007-0007411 A | 1/2007 |
| KR | 2007-0055456 A | 5/2007 |

OTHER PUBLICATIONS

J. Lopez, et al., WatchBot: A building maintenance and surveillance system based on autonomous robots, Robotics and Autonomous Systems, vol. 61, No. 12, Dec. 1, 2013.
Joaquin L. Fernandez, et al., Enhancing building security systems with autonomous robots, Technologies for Practical Robot Applications, 2008.
International Search Report for PCT/JP2017/031377 dated Oct. 17, 2017.
PCT written opinion dated Oct. 17, 2017.

* cited by examiner

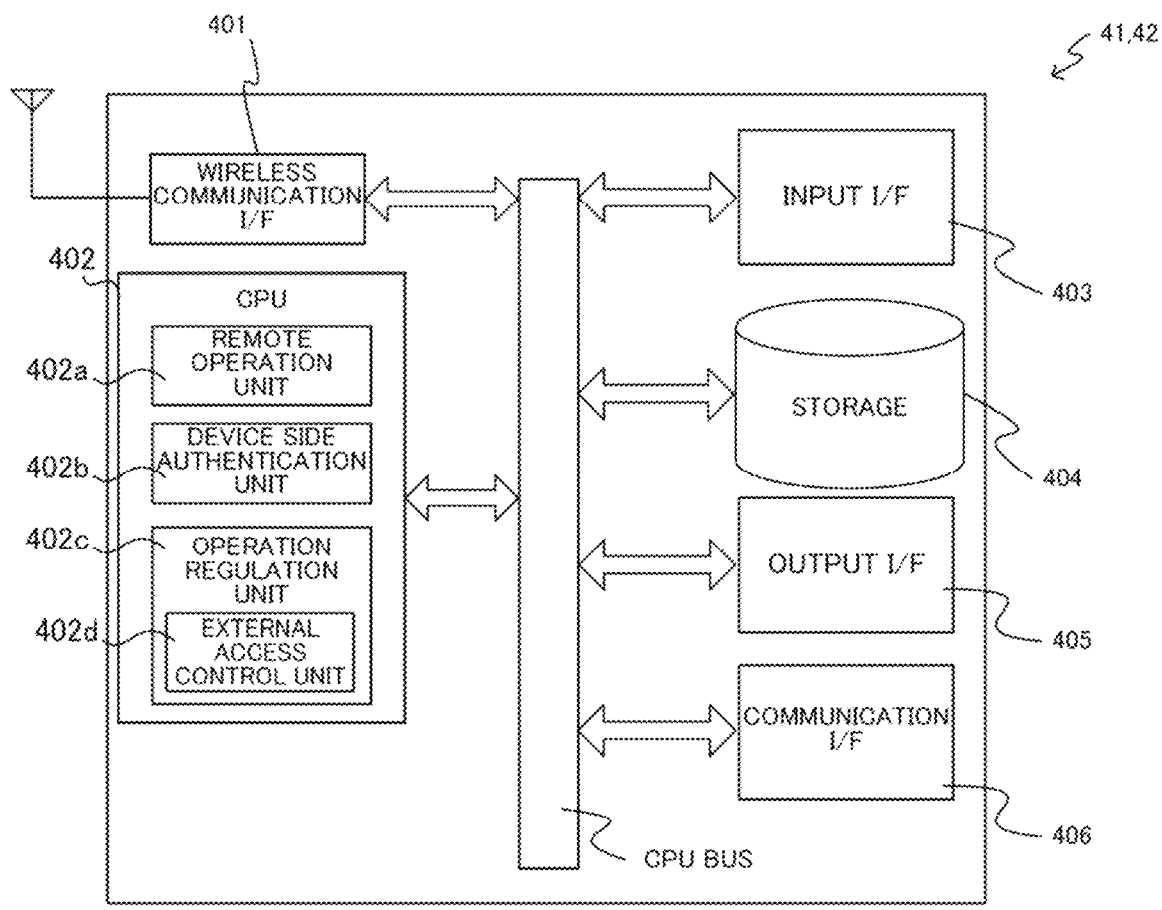
Fig. 2
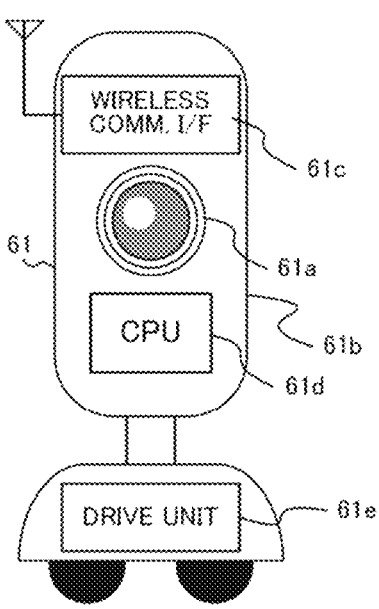

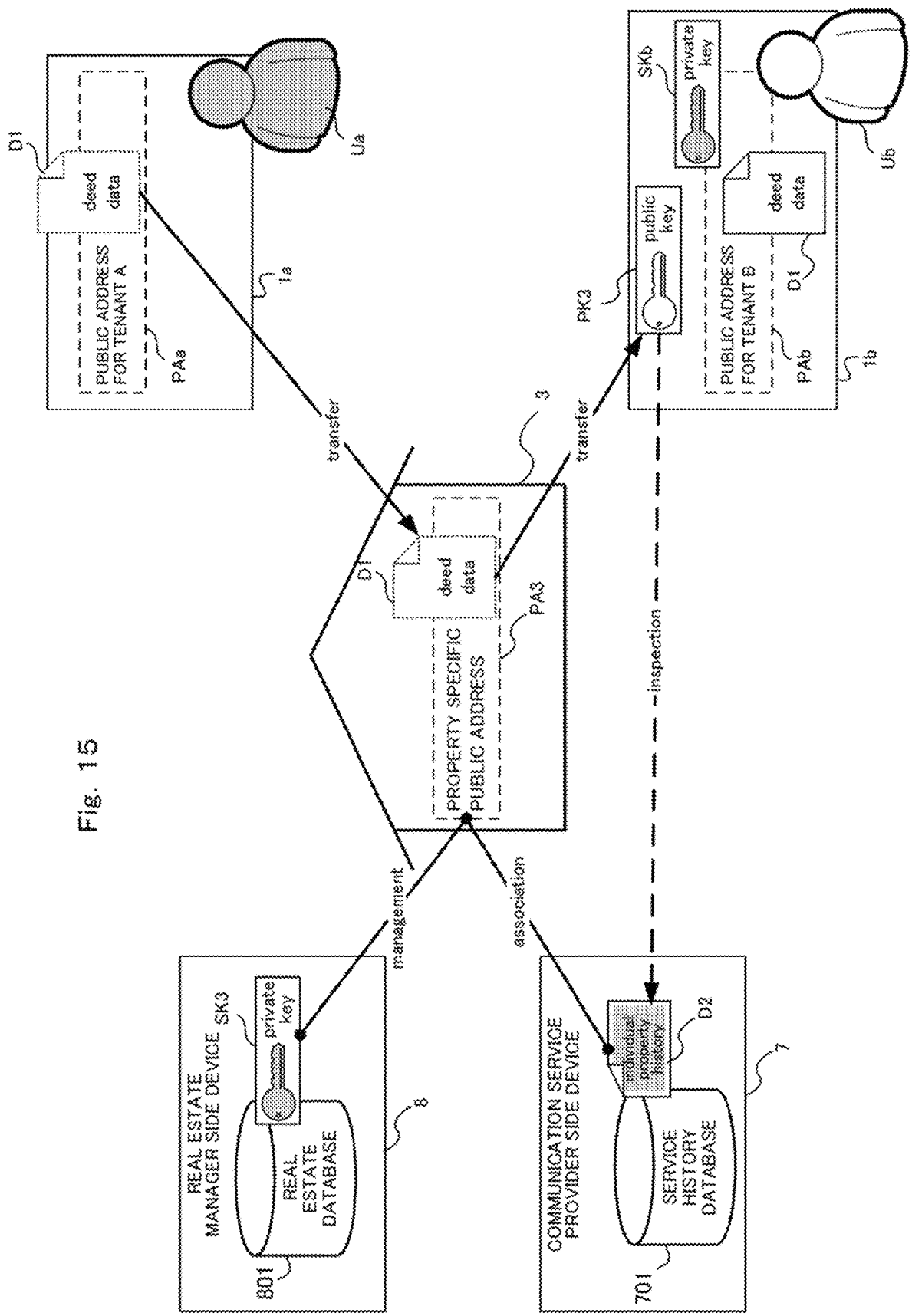

REAL ESTATE MANAGEMENT SYSTEM, METHOD, AND PROGRAM

TECHNICAL FIELD

The present invention relates to a real estate selling and buying intermediary method for carrying out a transaction contract, and a real estate management system, method and program for implementing this real estate selling and buying intermediary method.

BACKGROUND ART

Conventionally, a number of real estate properties are traded where, in order to smoothly and appropriately conclude an agreement, it is important that intermediary agents (for example, housing land and building dealers) are available to collect information about real estate properties and evaluate the values and the like of real estate properties on the basis of high-level expertise.

In the case of such conventional sales agreements made through intermediary agents, first, a seller looks for an intermediary agent through specialized real estate magazines and advertisements, and directly accesses this intermediary agent by telephone, visit or the like to tell information about a real estate property (sales object) that the seller want to sell. Then, the intermediary agent investigates the sales object, discusses selling conditions with the seller on the basis of investigation results. When the selling conditions are decided, the intermediary agent notifies the public of the selling conditions in specialized magazines, newspapers and the like. On the other hand, the buyer desiring to purchase a sales object directly accesses the intermediary agent in the same manner as the seller to tell the purchase conditions of the sales object that the buyer wants to purchase. The intermediary agent then investigates the real estate value or the like of the sales object that the buyer wants to purchase, and discusses the purchase conditions with the buyer. Thereafter, the intermediary agent of the seller and the intermediary agent of the buyer hold discussions to rearrange the selling conditions and the purchase conditions, if necessary, and conclude an sales agreement when these conditions coincide with each other. The intermediary agents receive intermediary fees from the buyer and the seller respectively (hereinafter, if necessary, the buyer and the seller are referred to as a "buying/selling person").

Meanwhile, with respect to such conventional real estate transaction, a system has been designed which makes it possible to request an intermediary service by appropriately connecting a buying/selling person and an intermediary agent in the form of a combination of purchase and finance of a real estate property (for example, Patent Document 1). In the case of the system described in this Patent Document 1, a server device is connected to a plurality of client devices through the Internet in order to communicate with each other, and the system comprises a step of registering specific information about an intermediary agent for buying and selling real estate properties, a step of registering specific information about an application for selling or buying a real estate property from a seller or a buyer of the real estate property when the application is filed, and a step of introducing the registered intermediary agent to the seller or buyer having filed the application for selling or buying the real estate property. In accordance with this system, it is possible to transmit and receive information necessary for real estate transaction through the Internet and more easily perform real estate transaction.

On the other hand, in recent years, while improvement of communication services have been needed as added values of real estate properties to develop properties with buildings provided with communication facilities in advance, the operation management of the facilities has been required as part of the management of the real estate properties. Furthermore, security and safety of real estate properties becomes an important index of value evaluation of the real estate properties so that the system for objectively evaluating the index is needed.

PRIOR ART DOCUMENTS

Patent Documents

Patent Document 1

Japanese Patent Published Application No. 2002-7541

SUMMARY OF THE INVENTION

Problems to be Solved by the Invention

However, in the case where the value of a real estate property is increased by providing a communication service and a security service, it is required to provide convenience for performing operation management by a real estate management company, privacy protection of tenants and advanced security countermeasure against data falsification. On the other hand, in the case of the above-mentioned conventional real estate intermediary system, it is necessary to build a system for intermediating sales of real estate properties, and also separately build a system for performing operation management the additional services, so that the real estate management company has to excessively bare equipment and operation costs. Also, objective evaluation of security and safety requires information about past performance and the like to necessitate a system for acquiring and saving the information and appropriately securing the reliability of the information, and therefore the equipment and operational costs become a considerable burden.

In order to solve the problem as described above, it is an object of the present invention to provide a real estate management system, method and program which can attain balance between convenience for performing operation management of real estate properties and privacy protection of tenants, and enhance the added value of the real estate properties while suppressing equipment and operation costs.

Means for Solving Problem

In order to accomplish the object as described above, the present invention is related to a real estate management system for managing real estate properties through a communication network, comprising:

an internal imaging unit which images an inside of the real estate property;

a tenant side device which controls communications through the internal imaging unit;

an operation regulation unit which regulates an operation of the tenant side device on the basis of an operation by a tenant of the real estate property;

a service provider side device which is connected to the internal imaging unit through the communication network for controlling a communication service with the internal imaging unit; and a real estate manager side device which is connected to the internal imaging unit through the communication network for controlling a real estate management service with the internal imaging unit, wherein the operation regulation unit includes:

an authentication unit which authenticates the tenant on the basis of deed data which certifies tenantship of the real estate property; and an external access control unit which permits the service provider side device and the real estate manager side device to access the internal imaging unit on the basis of the authentication result by the authentication unit and authorization operation by the tenant.

Also, another invention is related to a real estate management method for managing real estate properties through a communication network, comprising:

a tenant side step of installing an internal imaging unit which images an inside of the real estate property, and controlling communications by a tenant side device through the internal imaging unit;

an operation regulation step of regulating an operation of the tenant side device on the basis of an operation by a tenant of the real estate property;

a service provider side step of controlling a communication service with the internal imaging unit by the service provider side device connected to the internal imaging unit through the communication network; and a real estate manager side step of controlling a real estate management service with the internal imaging unit by the real estate manager side device connected to the internal imaging unit through the communication network, wherein the operation regulation step is performed such that the tenant is authenticated by an authentication unit on the basis of deed data which certifies tenantship of the real estate property; and includes an external access control step of permitting the service provider side device and the real estate manager side device to access the internal imaging unit on the basis of the authentication result by the authentication unit and authorization operation by the tenant.

In the case of the above invention, it is preferred that the real estate manager side device performs a preliminary inspection service through the internal imaging unit in accordance with the authentication result by the authentication unit of the tenant and the authorization operation of the tenant.

In the case of the above invention, it is preferred that the service provider side device can be connected to the internal imaging units of a plurality of tenants for performing a face-to-face communication service through the internal imaging units by connecting the tenant side devices of the tenants with each other in accordance with the authentication result by the authentication unit of each tenant and the authorization operation of the each tenant.

In the case of the above invention, it is preferred that the internal imaging unit is installed to image an opening site including at least either an entrance or a window of the real estate property from the insides of the real estate property, and that the service provider side device is provided with a service execution unit which executes a security record service for recording an image of the opening site with the internal imaging unit in accordance with the authentication result by the authentication unit of the tenant and the authorization operation of the tenant.

In the case of the above invention, it is preferred that the authentication unit is provided with an accumulating unit which accumulates history data obtained by time sequentially connecting information about successive tenants having occupied the real estate property provided with the authentication unit, and that the service provider side device comprises:

an analysis unit which accumulates information about execution results of the face-to-face communication service, and analyzes correlation between the history data and the execution results of the face-to-face communication service; and a matching execution unit which selects participants of the face-to-face communication service and performs matching among the tenants.

In the case of the above invention, it is preferred to further provide:

an accumulating unit which accumulates history data obtained by time sequentially connecting information about successive tenants having occupied the real estate property and execution results of the service execution unit;

an analysis unit which analyzes correlation between the history data and the execution results;

a cooperation unit which cooperates with a guarantee system which guarantees legitimacy of the deed data, wherein when ownership of the real estate property is transferred, the guarantee system acquires an analysis result from the analysis unit of the service provider side device and adds the acquired analysis result and the history data to the deed data.

In the case of the above invention, it is preferred that the real estate manager side device further comprises:

a cooperation unit which cooperates with a guarantee system which guarantees legitimacy of the deed data; and a real estate transaction execution unit which performs a transaction of the real estate property on the basis of a guarantee obtained by the cooperation unit.

In the case of the above invention, it is preferred that the real estate manager side device comprises:

an address issuance unit which issues a public address generated from a public key in accordance with a public key cryptographic system for identifying a certain user, and a private key paired with the public key and capable of identifying the public key for use in an electronic signature of a real estate transaction through the public address; and a real estate transaction execution unit which acquires the deed data to transfer the ownership of the real estate property by adding a public address relating to a new tenant and changing the tenant certified by the deed data.

Incidentally, the real estate management system and the real estate management method in accordance with the present invention as described above can be implemented in a computer by running the real estate management program of the present invention described in a predetermined language. Namely, the system having the functionality as described above can be built to implement the real estate management method by installing the program of the present invention in an IC chip or a memory device of a mobile terminal device, a smartphone, a wearable terminal, a mobile PC, another type information processing terminal, or a general purpose computer such as a personal computer or a server computer, and running the program on the CPU.

Also, the real estate management program of the present invention can be distributed, for example, through a communication line, or as a package application which can be run on a stand-alone computer by storing the program in a computer readable storage medium. Such a storage medium includes a magnetic recording medium such as a flexible disk or a cassette tape, an optical disc such as CD-ROM or DVD-ROM, a RAM card and a variety of storage mediums. In addition, in accordance with the computer readable medium in which this program is stored, the above system and method can be easily implemented with a general purpose computer or a dedicated computer, and the program can be easily maintained, transported and installed.

Effects of the Invention

As has been discussed above, in accordance with these inventions, it is possible to provide, in addition to the mechanism for conventional real estate transactions, a mechanism for attaining balance between convenience for performing operation management of real estate properties and privacy protection of tenants, and enhancing the added value of the real estate properties while suppressing equipment and operation costs.

Also, in accordance with the present invention, the internal imaging unit is installed to image an opening site including at least either an entrance or a window of the real estate property from the insides of the real estate property, and a security record service is executed by recording an image of the opening site imaged with the internal imaging unit in accordance with the authentication result by the authentication unit of the tenant and the authorization operation of the tenant. In accordance with this security record service, the performance information about the crime prevention state of the real estate property can be collected and stored by continuously imaging an opening site such as an entrance and storing the image so as not to be falsified, so that evidence for objectively evaluating security, safety and the like can be provided. As a result, without need for excessive equipment and operation costs, the reliability of information about such as past performance can be appropriately secured.

Particularly, since a distributed database mechanism is employed, a facility for performing system operation management need not be provided for each real estate agent. In other words, the distributed database mechanism serves to secure commonization of databases for information cooperation when information is exchanged among agents, and advanced security countermeasures of privacy protection and data falsification, so that it is possible to suppress equipment and operation costs.

BRIEF DESCRIPTION OF THE DRAWINGS

FIG. 2 is a block diagram showing the internal structure of a tenant side device in accordance with the first embodiment.

FIG. 15 is an explanatory view for showing an example of the procedure of transferring a real estate property by the real estate transaction system in accordance with the second embodiment.

MODE FOR CARRYING OUT THE INVENTION

First Embodiment (Overall Configuration of a Real Estate Management System)

Figure 1:
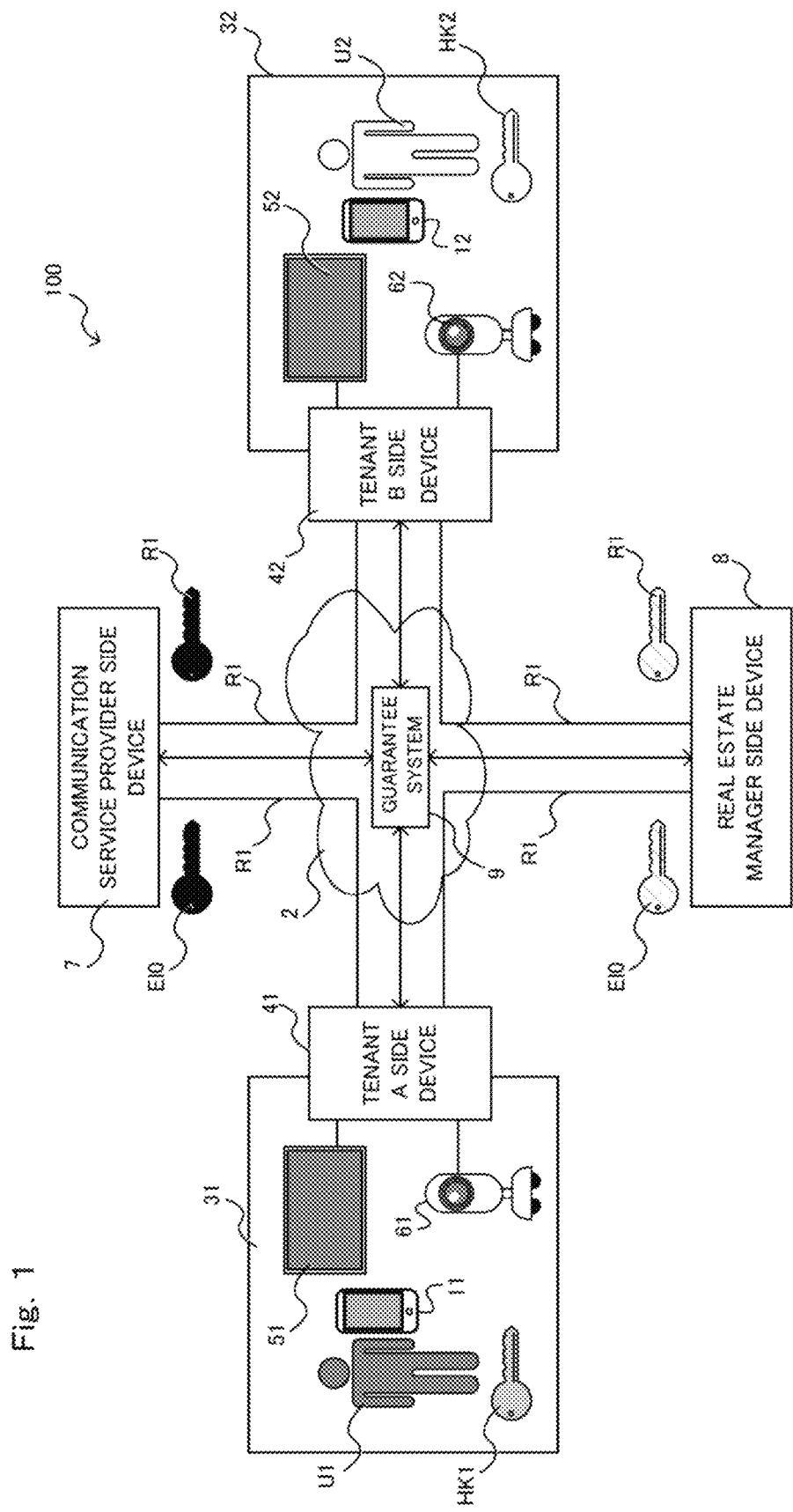
FIG. 1 is a schematic representation of the overall configuration of a real estate management system in accordance with a first embodiment.

In what follows, with reference to the accompanying drawings, an embodiment of a real estate management system in accordance with the present invention will be explained in detail. FIG. 1 is a schematic representation of the overall configuration of the real estate management system in accordance with the present embodiment.

As shown in FIG. 1, the real estate management system 100 of the present embodiment is a system with which a real estate management company manages real estate properties 3 (31 and 32) through a communication network 2. In the real estate properties 3 (31 and 32), there are arranged camera robots 61 and 62 which are internal imaging units for imaging the insides of the real estate properties, and tenant side devices 41 and 42 for controlling the operation of the camera robots 61 and 62 and communication through the camera robots 61 and 62. Meanwhile, in place of the camera robots 61 and 62, a crime prevention camera may be used as an internal imaging unit which can image an opening site such as an entrance, a door, a window, a ventilating opening or the like of the real estate property 3 from the insides of the real estate property 3. Also, a plurality of the camera robots 61 and 62 can be used to periodically or continuously image these opening sites.

The real estate property 3 is a real estate item which is a subject of a transaction such as a land or a building, and there are various forms of transactions such as a transaction of a building unit consisting mainly of a detached house, an apartment or the like, or a condominium/sales/rental system of a room. A real estate management company is an entity which manages real estate properties relating to transactions and performs intermediary services and the like relating to the transactions. A communication service provider in accordance with the present embodiment is an entity which performs management and operation of a communication infrastructure installed in the real estate property 3 and provides a communication service through the communication infrastructure.

The communication network 2 is an IP network using the communication protocol TCP/IP, and a distributed communication network which is constructed by connecting a variety of communication lines (a public network such as a telephone line, an ISDN line, an ADSL line or an optical line, a dedicated communication line, the third generation (3G) communication system such as WCDMA and CDMA2000, the fourth generation (4G) communication system such as LTE, the fifth generation (5G) or later communication system, and a wireless communication network such as wifi (registered trademark) or Bluetooth (registered trademark)). This IP network includes a LAN such as a home network, an intranet (a network within a company) based on 10BASE-T, 100BASE-TX or the like.

The tenant side devices 41 and 42 are server devices which control the communication with the camera robots 61 and 62 and are capable of communicating with other apparatuses through the communication network 2. These tenant side devices 41 and 42 permit imaging with the camera robots 61 and 62 in response to an authentication operation by a tenant who can determine the area where the camera robots 61 and 62 can image and permit or restrict external access to the motion image.

The camera robots 61 and 62 are devices provided with cameras which image the insides of the real estate properties, and in the case of the present embodiment, each robot is provided with a main body 61*b* incorporating a camera 61*a*, a drive unit 61*e* provided for self-traveling at the lower portion of the main body 61*b*, a wireless communication interface 61*c* for performing wireless communication, and a CPU 61*d* for controlling the operations of these elements. The camera robots 61 and 62 are designed, in the case of the present embodiment, to move by self-traveling, but can be designed as a small-sized drone provided with a flying means or as a walking robot provided with a walking means. Furthermore, the camera robots 61 and 62 can be designed with no moving means as an imaging system which can image everywhere in the real estate property 3 by switchingly using a number of cameras which are located in each room of the real estate property 3.

Also, users U1 and U2, i.e., the tenants of the real estate properties 31 and 32, possess smartphones 11 and 12 respectively which serve as an operation regulation unit to regulate the operation of the tenant side devices 41 and 42 on the basis of the operation by the users U1 and U2.

A communication service provider side device 7 which is operated by a company providing communication services, and the real estate manager side device 8 which manages real estate properties, are located on the communication network 2. The communication service provider side device 7 is a server device connected to the camera robots 61 and 62 through the communication network 2 for controlling the communication service with the camera robots 61 and 62. The real estate manager side device 8 is a server device connected to the camera robots 61 and 62 through the communication network 2 for controlling the real estate management service with the camera robots 61 and 62. Furthermore, a guarantee system 9 is located between the communication service provider side device 7 and the real estate manager side device 8 to guarantee real estate transactions.

(Configuration of Each Device)

Figure 3:
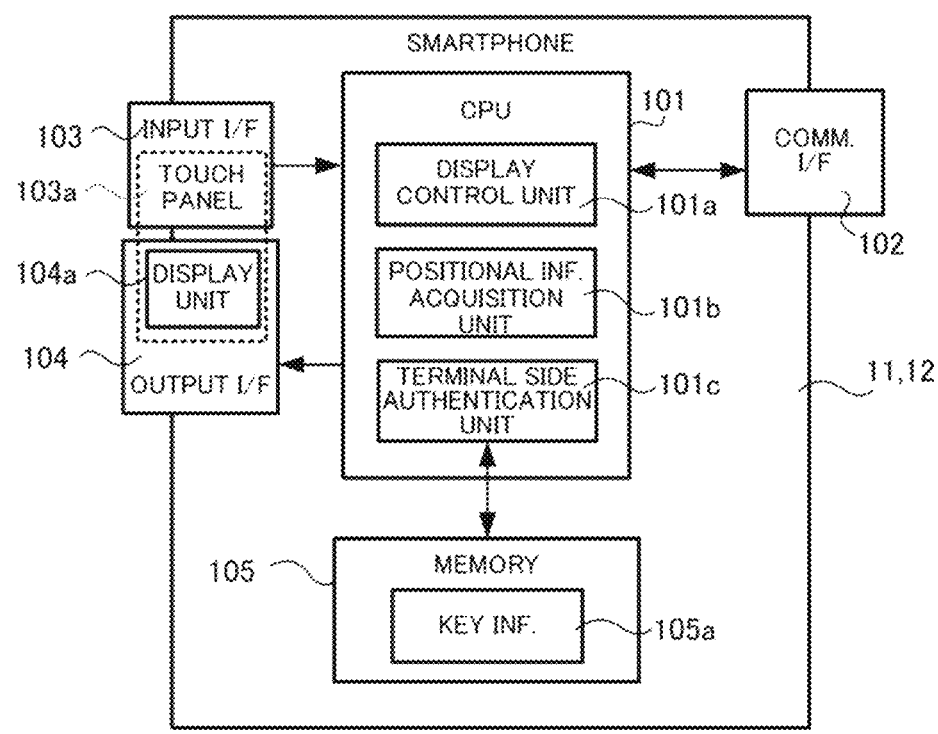
FIG. 3 is a block diagram showing the internal structure of the smartphone used by a tenant in accordance with the first embodiment.

Next, the configuration of each device will be explained. FIG. 2 is a block diagram showing the internal structure of the tenant side device in accordance with the present embodiment, and FIG. 3 is a block diagram showing function modules of the smartphone used by a tenant in accordance with the present embodiment. Meanwhile, in the context of this document, the term "module" is intended to encompass any function unit capable of performing necessary operation, as implemented with hardware such as a device or an apparatus, software capable of performing the functionality of the hardware, or any combination thereof.

(1) Configuration of the Tenant Side Device.

As shown in FIG. 2, the tenant side device 41 or 42 is a server device which is located in each real estate property to control communication through the camera robot 61 or 62. This tenant side device is implemented with a device provided with information processing capability, i.e., a general purpose computer or a dedicated device. Specifically, the tenant side device 41 or 42 is provided with a wireless communication interface 401, a CPU 402, an input interface 403, a storage device 404, an output interface 405 and a communication interface 406. Meanwhile, in the case of the present embodiment, these elements are connected to each other through a CPU bus to exchange data thereamong.

The wireless communication interface 401 is a communication device for remote controlling the camera robot 61 through a communication system including Wifi, Bluetooth or any other communication system using radio waves, an infrared communication, a sound wave data communication, or an IP network communication using the communication protocol TCP/IP such as the Internet.

The storage device 404 accumulates data on a recording medium, and reads out accumulated data from the recording medium in response to an request from each device. The storage device 404 may be implemented, for example, by a hard disk drive (HDD), a solid state drive (SSD), a memory card, and the like.

The input interface 403 is a module for receiving operation signals from an operation device such as a touch panel or buttons. The received operation signals are transmitted to the CPU 402 so that it is possible to perform operations of an OS or each application. The output interface 405 is a module for transmitting image signals and sound signals to output an image and sound from an output device such as a display or a speaker. Incidentally, in the case of the present embodiment, the input interface 403 and the output interface 405 are connected to a physical operation switch such as a touch panel or a button to provide a GUI through which a user operation signal is acquired by displaying display data on an operation screen of a display to prompt a user to perform a touch operation and a button operation in accordance with the display data.

The communication interface 406 is a module for transmitting and receiving data to/from other communication devices on the basis of a communication system including a public network such as a telephone line, an ISDN line, an ADSL line or an optical line, a dedicated communication line, the third generation (3G) communication system such as WCDMA and CDMA2000, the fourth generation (4G) communication system such as LTE, the fifth (5G) generation or later communication system, and a wireless communication network such as wifi (registered trademark) or Bluetooth (registered trademark)).

The CPU 402 is a device which performs a variety of arithmetic operations required for controlling each element to virtually build a variety of modules on the CPU 402 by running a variety of programs. In the case of the present embodiment, by running a call connection rate measurement program on this CPU 402 in accordance with the present invention, it is possible to use this general purpose information processing apparatus as the tenant side device.

Then, an OS (Operating System) is executed and run on the CPU 402 to perform management and control of the basic functions of the smartphone 1. Also, a variety of applications can be executed on this OS to implement a variety of functions by running the applications on this CPU 402.

The basic functions of the tenant side device 4 (41, 42) are managed and controlled by running the OS program on the CPU 402, and a variety of functional modules are virtually built on the CPU 402 by running applications on the CPU 402. In the case of the present embodiment, a remote operation unit 402a, a device side authentication unit 402b and an operation regulation unit 402c are built on the CPU 402, and the operation regulation unit 402c is provided with the device side authentication unit 402b and an external access control unit 402d.

The remote operation unit 402a is a module for operating the camera robot 61 to perform the imaging control, motion control, power supply management or the like control of the camera robot 6 on the basis of the detection values of various sensors installed in the camera robot 61, the operation control by a user and the automatic control using a predetermined algorithm.

The device side authentication unit 402b is an authentication unit which authenticates a tenant, and performs an authentication process by a cooperative process with the smartphone 1 used by a user on the basis of deed data which certifies the tenantship of the real estate property 31. Also, the device side authentication unit 402b is associated with the storage device 404 as an accumulating unit which accumulates history data obtained by time sequentially connecting information about successive tenants having occupied the real estate property.

The operation regulation unit 402c is a module for regulating the operation of the tenant side device 4 (41, 42) on the basis of the operation by a tenant of the real estate property 3. This operation regulation unit 402c permits imaging with the camera robots 61 and 62 on the basis of the authentication operation of a tenant so that the tenant U1 can permit or limit the range of imaging with the camera robots 61 and 62 and an external access to the motion picture as imaged.

The external access control unit 402d is a module for controlling access by the tenant himself and access by the real estate manager and the communication service provider to the tenant side device 41 so that, for example, the communication service provider side device 7 and the real estate manager side device 8 are permitted to access the camera robot 61 on the basis of the authentication result by the device side authentication unit 402b and authorization operation by the tenant himself.

(2) Configuration of the Smartphone

The smartphone 1 is an information processing terminal provided with a communication capability and a CPU and capable of performing a variety of functions by installing a variety of application software. In the case of the present embodiment, the smartphone can be used as a controller for tenant by installing and executing an application for smartphone. The information processing terminal serving as this controller for tenant includes, besides a smartphone, a general purpose computer such as a personal computer, a functionally specialized dedicated device, a tablet PC, a mobile computer, a PDA (Personal Digital Assistance) and a cellular phone.

More specifically described, as illustrated in FIG. 3, the smartphone 1 includes a CPU 101 which performs arithmetic operations, a memory 105 which stores information, a communication interface 102 which performs communication with the outside through the communication network 2, an output interface 104 and an input interface 103.

The CPU 101 is a device which performs a variety of arithmetic operations required for controlling each element to virtually build a variety of modules on the CPU 101. In the case of the present embodiment, it is possible to use this general purpose smartphone 1 as an authentication device by running an application for tenant on this CPU 101.

The communication interface 102 is a module for performing short distance wireless communication, telephone conversation and data communication through wireless communication, including Wifi, Bluetooth or any other communication system using radio waves, an infrared communication and a sound wave data communication, and an IP network communication using the communication protocol TCP/IP such as the Internet is also used.

Meanwhile, the CPU bus is connected to the input interface 103 for receiving user operations and the output interface 104 for controlling outputs such as images, sound and LED lighting. The output interface 104 is a module for transmitting image signals and sound signals to output images and sound from output devices such as a display and a speaker, i.e., output images and sound relating to application software which is running on the CPU 101.

The input interface 103 is a module for receiving operation signals from an operation device such as a touch panel or buttons. The received operation signals are transmitted to the CPU 101 so that it is possible to perform operations of an OS or each application. Incidentally, in the case of the present embodiment, the input interface 103 and the output interface 104 are connected to a physical operation switch such as a touch panel or a button to provide a GUI through which a user operation signal is acquired by displaying display data on an operation screen of the display unit 104a of a display or the like to prompt a user to perform a touch operation and a button operation in accordance with the display data.

Then, an OS (Operating System) which is developed for smartphone is executed and run on the CPU 101 to perform management and control of the basic functions of the smartphone 1. Also, a variety of applications can be executed on this OS to implement a variety of functions by running the applications on this CPU 101.

The basic functions of the smartphone are managed and controlled by running the OS program on the CPU 101, and a variety of functional modules are virtually built on the CPU 101 by running applications on the CPU 101. In the case of the present embodiment, a display control unit 101a, a positional information acquisition unit 101b and a terminal side authentication unit 101c are virtually built on the CPU 101.

The display control unit 101a is a module for generating display information (images, text information and the like) to be displayed on the display unit 104a to display an image of an application running on the CPU 101 and change the displayed image on the basis of the user operation which is input through the input interface 103.

The positional information acquisition unit 101b is a module for measuring the current position of own device with reference to GPS signals, the identifier/coordinates of a radio base station and the like. Incidentally, the CPU 101 is connected to a clock unit which counts the current time, and the measurement result of the positional information acquisition unit 101b and the measurement result of the clock unit are transferred in response to a request from the OS or the application running on the CPU 101.

The terminal side authentication unit 101c is a module for authenticating the tenant U1 on the basis of deed data D1 which certifies the tenantship of the real estate property 31. In the case of the present embodiment, the terminal side authentication unit 101c performs an authentication process in cooperation with the device side authentication unit 402b of the tenant side device 41 on the basis of the deed data which certifies the tenantship of the real estate property 31.

(3) Configuration of the Real Estate Manager Side Device

Figure 4A:
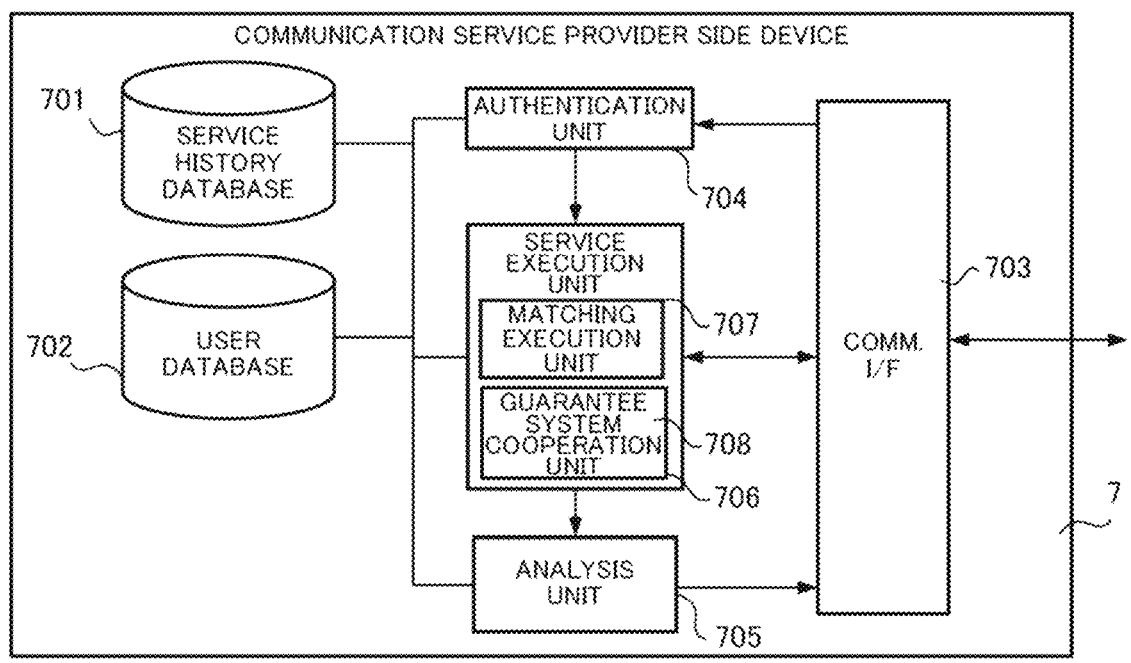
FIGS. 4A and 4B are block diagrams showing the internal structures of a communication service provider side device and a real estate manager side device in accordance with the first embodiment.
Figure 4B:
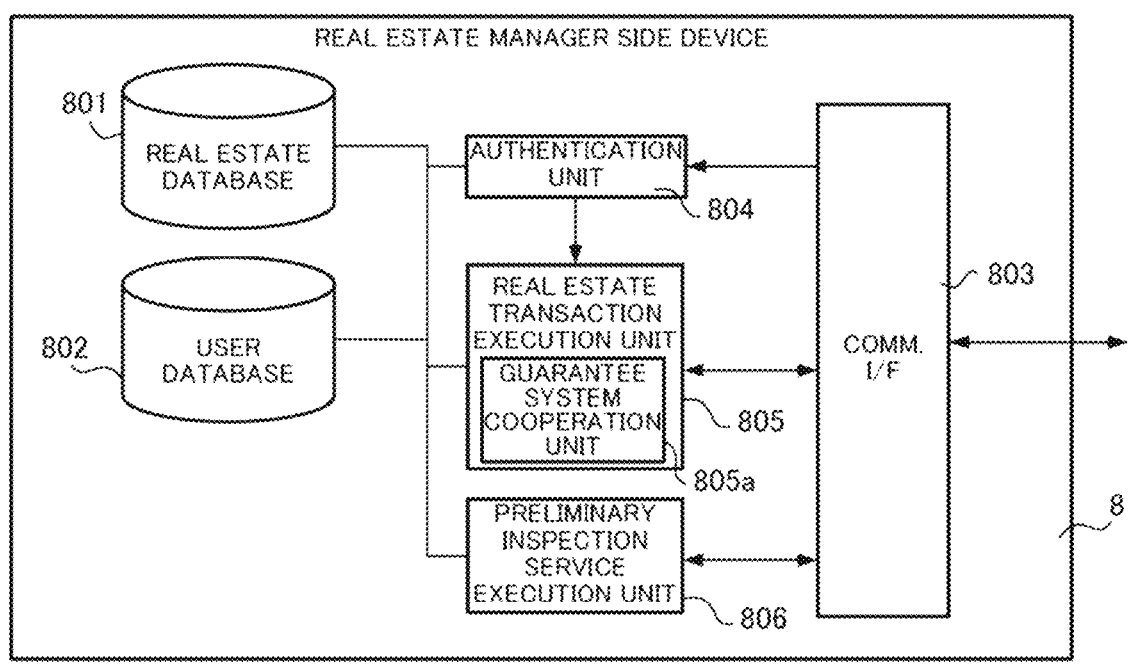

The real estate manager side device 8 is a server device which is managed and operated by a real estate management company which manages real estate properties and performs intermediation or the like of the transaction of the real estate properties through the communication network 2. Specifically, as illustrated in FIG. 4B, the real estate manager side device 8 is provided with a communication interface 803, an authentication unit 804, a real estate transaction execution unit 805, a real estate database 801, a user database 802 and a preliminary inspection service execution unit 806.

The communication interface 803 is a module for transmitting and receiving data to/from other communication devices through the communication network 2. In the case of the present embodiment, the communication interface 803 is connected to the tenant side device 41 of each real estate property and the guarantee system 9.

The authentication unit 804 is a computer or software capable of verifying the legitimacy of an accessing person, and performs an authentication process on the basis of the user ID identifying each user. In the case of the present embodiment, by acquiring a user ID and a password from the user terminal of an accessing user through the communication network 2 to collate them with the user database 802, it is confirmed whether or not the accessing user has right qualification, whether or not the accessing user is the qualified person and so forth.

The preliminary inspection service execution unit 806 is a module for performing a preliminary inspection service through the camera robots 61 and 62 in accordance with the authentication result of the tenant by the authentication unit and the authorization operation of the tenant. The real estate transaction execution unit 805 is a module for intermediating real estate transactions through the communication network 2. The real estate transaction execution unit 805 of the present embodiment is provided with a guarantee system cooperation unit 805a. This guarantee system cooperation unit 805a is a module for requesting the guarantee system 9 on the network to cooperatively perform processes necessary for real estate transactions, i.e., credit relating to real estate transactions, security management, retention of transaction records and so forth.

The real estate transaction execution unit 805 acquires deed data in cooperation between the guarantee system cooperation unit 805a and the guarantee system 9 to transfer the ownership of a real estate property by adding a public address relating to a new tenant and changing the tenant certified by the deed data.

Also, when the ownership of the real estate property is transferred, the real estate transaction execution unit of the real estate manager side device 8 acquires an analysis result from an analysis unit implemented in the service provider side device and adds the acquired analysis result to the deed data. The real estate database 801 is a storage device for accumulating information about each real estate property, and the user database 802 is a storage device for accumulating information about registered members and tenants. The user database 802 is a storage device for accumulating information about each tenant. Meanwhile, in the case of the present embodiment, the personal information identifying a user is not accumulated in the user database 802 which stores only public account information identifying each tenant and each user. The credit information necessary for real estate transactions is evaluated with reference to the response content returned from the guarantee system 9 which is requested for credit relating to the public account of each tenant.

(4) Configuration of the Communication Service Provider Side Device

The communication service provider side device 7 is a server device which is connected to the camera robots 61 and 62 through the communication network 2 to control communication service provided by the use of the camera robots 61 and 62. Specifically, as illustrated in FIG. 4A, the communication service provider side device 7 is provided with a communication interface 703, an authentication unit 704, a service execution unit 706, a service history database 701, a user database 702 and an analysis unit 705.

The communication interface 703 is a module for transmitting and receiving data to/from other communication devices through the communication network 2. In the case of the present embodiment, the communication interface 703 is connected to the tenant side device 41 or 42 of each real estate property and the guarantee system 9.

The authentication unit 704 is a computer or software capable of verifying the legitimacy of an accessing person, and performs an authentication process on the basis of the user ID identifying each user. In the case of the present embodiment, by acquiring a user ID and a password from the user terminal of an accessing user through the communication network 2 to collate them with the user database 702, it is confirmed whether or not the accessing user has right qualification, whether or not the accessing user is the qualified person and so forth.

The service execution unit 706 is a module which can be connected to the camera robots 61 and 62 of a plurality of tenants for performing a face-to-face communication service through the camera robots 61 and 62 by connecting the tenant side devices of the tenants with each other in accordance with the authentication result by the authentication unit 704 of each tenant and the authorization operation of the each tenant. Also, the service execution unit 706 is provided with the function to execute a security record service for recording images of opening sites such as an entrance, a window and the like with internal imaging units (camera robots, crime prevention cameras and the like) in accordance with the authentication result by the authentication unit 704 of the tenant and the authorization operation of the tenant. Incidentally, these opening sites may be periodically or continuously imaged by the security record service, or may be imaged only when something happens near the opening sites through a human sensor, a moving body recognition technique or the like.

In addition, the service execution unit 706 of the present embodiment is provided with a matching execution unit 707 and a guarantee system cooperation unit 708. The matching execution unit 707 is a module for selecting the participants of the face-to-face communication service and performing matching among tenants, recommendation of a dialogue counterpart and the like service on the basis of the analysis result by the analysis unit 705. The guarantee system cooperation unit 708 is a module for requesting the guarantee system 9 on the network to cooperatively perform processes necessary for real estate transactions, i.e., credit relating to tenants participating the face-to-face communication service, security management, retention of transaction records and so forth.

The service history database 701 is a storage device for accumulating information about the execution histories of the face-to-face communication service and the security record service, and the user database 702 is a storage device for accumulating information about registered members and tenants. Meanwhile, in the case of the present embodiment, the personal information identifying a user is not accumulated in the user database 702 which stores only public account information identifying each tenant and each user. The credit information necessary for the face-to-face communication service is evaluated with reference to the response content returned from the guarantee system 9 which is requested for credit relating to the public account of each tenant.

The analysis unit 705 is a module for reading information about execution results of the face-to-face communication service and the security record service accumulated in the service history database 701, and analyzing the correlation between information about successive tenants having occupied the real estate property and the execution results of the face-to-face communication service and the security record service.

The matching execution unit 707 selects the participants of the face-to-face communication service on the basis of the analysis result of the face-to-face communication service by this analysis unit 705 to perform matching between the tenants. The execution result of the face-to-face communication service relating to this matching is accumulated in the service history database 701.

(5) Configuration of the Guarantee System

Figure 5:
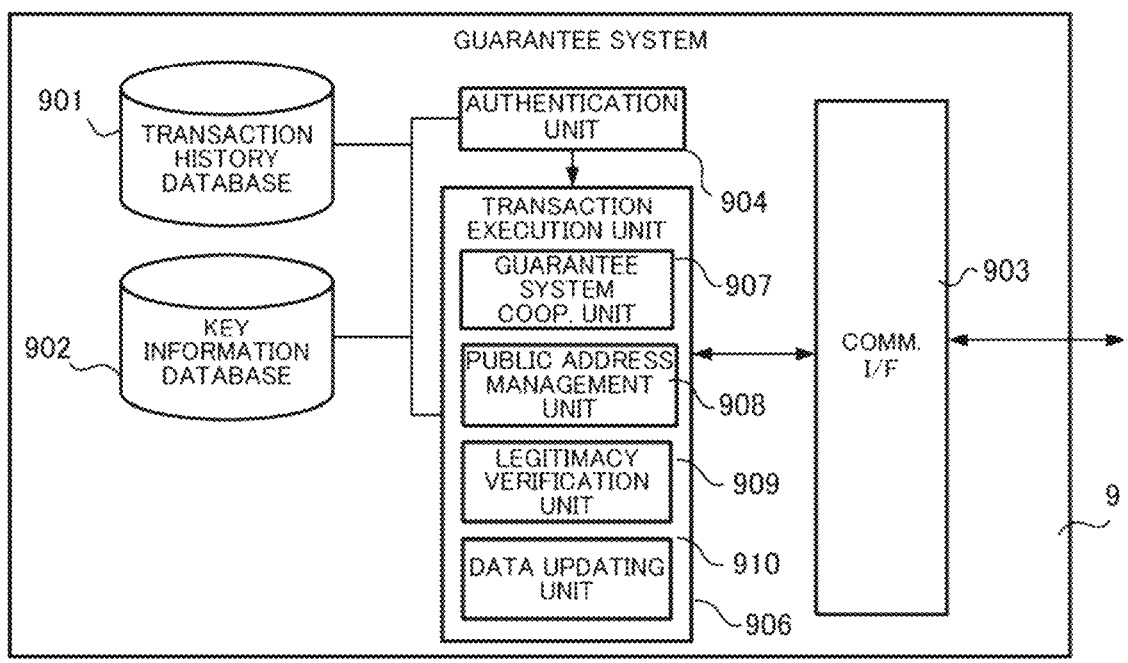
FIG. 5 is a block diagram showing the internal structure of a guarantee system in accordance with the first embodiment.

The guarantee system 9 is located between the communication service provider side device 7 and the real estate manager side device 8 to guarantee real estate transactions. Specifically, as illustrated in FIG. 5, the guarantee system 9 is provided with a communication interface 903, an authentication unit 904, a transaction execution unit 906, a transaction history database 901 and a key information database 902.

The communication interface 903 is a module for transmitting and receiving data to/from other communication devices through the communication network 2 and, in the case of the present embodiment, connected to the tenant side devices 41 and 42 of the real estate properties, the service provider side device 7 and the real estate manager side device 8.

The authentication unit 904 is a computer or software capable of verifying right qualification of an accessing person, and performs an authentication process on the basis of the user ID identifying each user. In the case of the present embodiment, by acquiring, from the user terminal of an accessing user, a public address and a public key unique to the user, a user ID and a password through the communication network 2 to collate them with the key information database 902, it is confirmed whether or not the accessing user has right qualification, whether or not the accessing user is the qualified person and so forth.

The transaction execution unit 906 is a module for handling deed data which certifies that a user owns or rents a real estate property. This deed data is associated with the public account of the legitimate owner of each real estate property and can be used to certify the legitimate ownership of the real estate property by presenting the relationship to the public account. Also, this deed data is certificate data with which a person who is not the legitimate right holder cannot carry out a transfer procedure such as ownership transfer of the real estate property. This transaction execution unit 906 is provided with a guarantee system cooperation unit 907, a public address management unit 908, a legitimacy verification unit 909 and a data updating unit 910.

The guarantee system cooperation unit 907 is a module for requesting the guarantee system 9 on the network to cooperatively perform processes necessary for real estate transactions, i.e., credit relating to real estate transactions and the face-to-face communication service, security management, retention of transaction records and a service history and so forth in response to a request from a device of another service system, for example, the real estate manager side device 8 or the communication service provider side device 7.

The public address management unit 908 serves as an address issuance unit which issues a public address generated from a public key in accordance with a public key cryptographic system for identifying a certain user, and a private key paired with the public key and capable of identifying the public key for use in an electronic signature of real estate transactions through the public address. The issued public address and key information are accumulated in the key information database 902.

The legitimacy verification unit 909 is a module for verifying that the deed data of a property relating to a real estate transaction belongs to the current owner through legitimate transactions, so that the legitimacy of the deed data can be confirmed by the use of the public key of the current owner associated with the public account, that all the transactions concerning the deed data are accumulated in the transaction history database 901, and that the legitimacy of the deed data can be confirmed with reference to the transaction history database 901 on the basis of the public key.

The data updating unit 910 is a module for transferring the ownership of the real estate property by adding the public address of a new tenant and changing the tenant which can be certified by the deed data. Updating of data by the data updating unit 910 is protected by high security to strongly prevent double assignment and tampering of the transaction history.

(Operation of the Real Estate Management System)

A variety of services can be provided by operating the real estate management system as explained above. In the case of the present embodiment, the face-to-face communication service, the preliminary inspection service and the real estate transaction service will be explained.

(1) Face-to-Face Communication Service

The face-to-face communication service is a service for promoting communication among tenants by making use of face-to-face communication with a video telephone between real estate properties in which this real estate management system is installed. For example, it is possible to provide opportunities for English conversation by connecting children's rooms of families of different languages, e.g., a Japanese family and a Westerner family, and utilize a variety of face-to-face services such as seeking friends among tenants, nursing care for elderly person, medical diagnosis and so forth.

Figure 6:
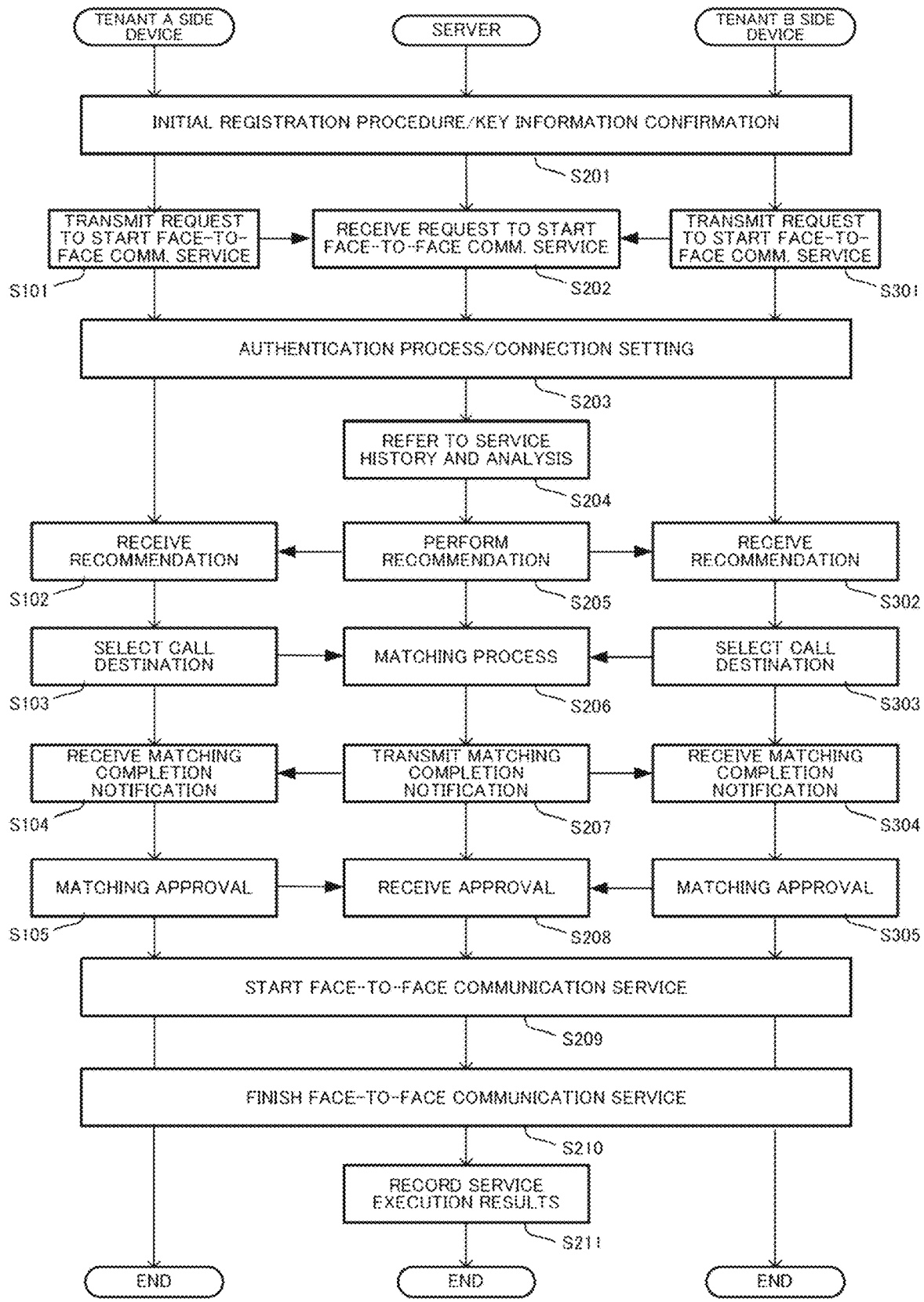
FIG. 6 is a sequence diagram for showing the operation of a face-to-face communication service of the real estate management system in accordance with the first embodiment.

With respect to the face-to-face communication service as described above, the present embodiment is provided with a search function for service providers and tenants of other real estate properties to be communication partners, and a matching and recommendation function on the basis of the face-to-face communication history. FIG. 6 is a sequence diagram for showing the operation of such a face-to-face communication service.

As shown in FIG. 6, tenants A and B desiring to use the face-to-face communication service perform an initial registration procedure (S201). In this case, each tenant accesses the communication service provider side device 7, and inputs own attribute information (family structure, the age, gender, occupation, native language and residential area of each individual of the family), and the attribute information (family structure, the age, gender, occupation, native language and residential area of each individual of the family) of a desired communication partner in a predetermined format to register the information in the database of the communication service provider side device 7. With respect to the attribute information, the disclosure range of each information item can separately be set up, such that each tenant can select whether each information item is disclosed only to the communication service provider or disclosed to specified/unspecified communication partners.

This initial registration procedure can be performed through the smartphone 1 used by each tenant. The registration information input through the smartphone 1 is accumulated in the database of the communication service provider side device 7 together with public/private settings. Also, this initial registration procedure is performed in the communication service provider side device 7 to confirm key information stored in the smartphone 1 for the purpose of authenticating the operator of the smartphone 1 as a legitimate tenant.

In the case of the present embodiment, this key information can be confirmed through identification information (a public key, a public account) which identifies the key information, and the operator of the smartphone 1 is confirmed only as a legitimate tenant by confirming the legitimacy of the public key and the public account. By this process, while concealing the personal information of the tenant associated with the public key and the public account, the registration procedure can be performed with the communication service provider side device 7. It is possible to individually set disclosure of the personal information of the tenant associated with the public account and the like in accordance with the type of the face-to-face communication service. Furthermore, when confirming this key information, the communication service provider side device 7 can inquire the public account to the real estate manager side device 8 which can return occupation records (the number of residence years, the rent payment results and the like) of the tenant who is the owner of the key information in response to the inquiry of this public account.

After completing the initial registration procedure, each tenant transmits a request to start the face-to-face communication service to the communication service provider side device 7 (S101, S301). When transmitting this start request, it is possible to designate of a certain communication partner, search under a condition set for a communication partner, select a communication partner by automatic matching or recommendation in the service side. As a timing to start communication, it is possible to appropriately set an immediate start timing when desired, or a start timing by designating a conversation viable time/period as a reservation.

Receiving the start request of the face-to-face communication service, the communication service provider side device 7 performs authentication of each tenant, and then performs a communication connection process (S203). This authentication process can be performed only by confirming the service account (user ID and the like) and the password which are registered in the initial registration procedure for the communication service. Then, in the case where a communication partner is already designated when requesting starting, the face-to-face communication service can be started in step S209 by calling the communication partner and performing a connection process in accordance with the response of the communication partner. Incidentally, when a communication partner is designated but does not respond to a call, an automatic answering telephone function using, for example, a voice message, video email, a text message can be used.

In this case, an example is described in the case where no communication partner is designated and where automatic matching and recommendation in the service side is used. In the case where no communication partner is designated when requesting start of the face-to-face communication service, the communication service provider side device 7 refers to the service history of the tenant requesting start, analyzes the attributes of suitable communication partners, and selects communication partners satisfying the condition (S204). This service history is a history of face-to-face communications performed by each tenant in the past, and stores the attribute information of conversation partners, the conversation time with each conversation partner, the number of call times, the time zone for conversation, a history of recommendation, and a list (black list) of persons who reject conversation. The communication service provider side device 7 selects conversation partners who are expected to be suitable for conversation with reference to the service history of each tenant and a desired conversation time included in the face-to-face communication service start request and the like, and transmits the list of the selected conversation partners to each tenant as recommendation (S205).

Receiving the recommendation, the tenant A or B selects a desired conversation partner (call destination) from the recommendation list, and returns the selection to the communication service provider side device 7 (S102, S103, S302 or S303). In this case, a plurality of desired conversation partners can be selected, and desired preferential order can be set to the conversation partners. Receiving the selection of conversation partners from the tenants, the communication service provider side device 7 performs a matching process to extract pairs of conversation partners whose selections match each other (S206). In this matching process, if a preferential order is set to the selected conversation partners, pairs are extracted in accordance with the preferential order. When no pair is matched, the tenant is notified of this fact, and recommendation (S205) is performed again by changing the condition. This recommendation and the matching process can be recorded as the service history, and it is possible to analyze the matching trend.

Then, after determining paired communication partners, matching completion notifications are transmitted to both tenants (S207), and each tenant receiving the matching completion notification (S104, S304) transmits approval of the matching to the communication service provider side device 7 as matching approval (S105, S305). When receiving matching approval from both tenants (S208), the communication service provider side device 7 calls both tenants to start the face-to-face communication service (S209). In the case where a communication viable time is set, this calling is performed when the conversation viable time arrives. Then, after the face-to-face communication is finished (S210), the communication service provider side device 7 records the conversation time, period and the like of the face-to-face communication as service execution results and the service history in the database together with information about pairing of the tenants having performed the face-to-face communication.

(2) Preliminary Inspection Service

Next, the preliminary inspection service in accordance with the present embodiment will be explained. The preliminary inspection service is a service for providing information about real estate property sales by disclosing images in a real estate property through the camera robots 61 and 62 of the tenant Ua provided in the real estate property. This preliminary inspection service may be provided when the tenant is still occupying the real estate property or when a real estate intermediary agent is entrusted with the real estate property sales transaction after the tenant vacated the real estate property.

(2-1) Preliminary Inspection with an Occupying Tenant

Figure 7:
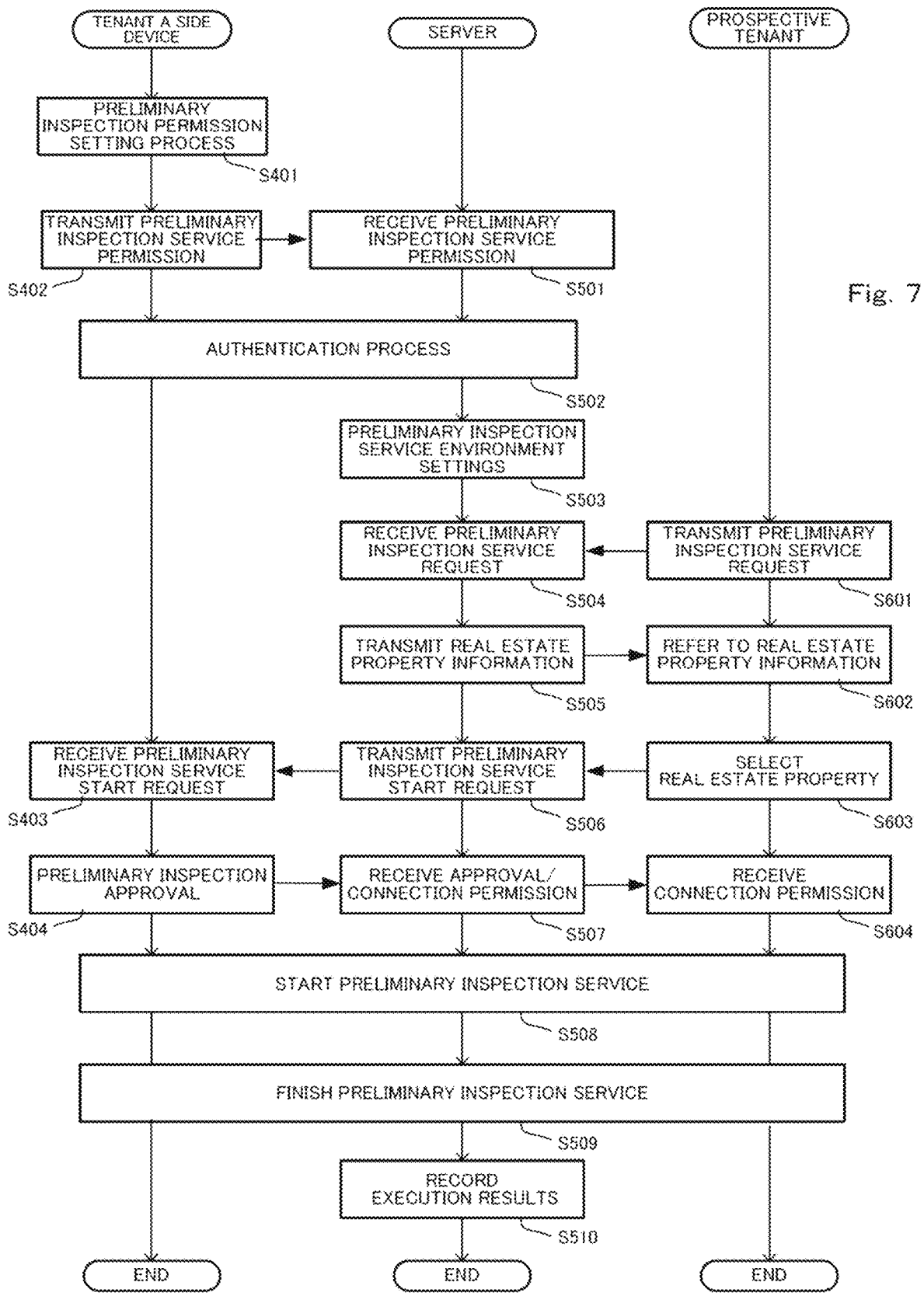
FIG. 7 is a sequence diagram for showing the operation of a preliminary inspection service by a tenant of the real estate management system in accordance with the first embodiment.

FIG. 7 is a sequence diagram for showing the operation of the preliminary inspection service when a tenant is still occupying a real estate property. Incidentally, this example is described in the case where the preliminary inspection service is performed for a prospective tenant while the tenant A is still occupying the real estate property.

As shown in FIG. 7, the tenant A desiring the use of the preliminary inspection service performs preliminary inspection permission settings (S401). In this example, the tenant A accesses the real estate manager side device 8 to set permission of preliminary inspection. When setting the permission, it is possible to limit object persons who are permitted preliminary inspection by inputting the attribute information (family structure, the age, gender, occupation, native language and residential area of each individual of the family) of desired permitted persons in a predetermined format to register the information in the real estate manager side device 8. This preliminary inspection permission setting process can be operated through the smartphone 1 used by each tenant. The registration information input through the smartphone 1 is accumulated in the database of the real estate manager side device 8 together with public/private settings. Also, in this preliminary inspection permission setting process, the key information stored in the smartphone 1 is confirmed by the communication service provider side device 7 for the purpose of authenticating the operator of the smartphone 1 as a legitimate tenant.

In the case of the present embodiment, this key information can be confirmed through identification information (a public key, a public account) which identifies the key information, and the operator of the smartphone 1 is confirmed only as a legitimate tenant by confirming the legitimacy of the public key and the public account. By this process, while concealing the personal information of the tenant associated with the public key and the public account, the registration procedure can be performed with the communication service provider side device 7. It is possible to individually set disclosure of the personal information of the tenant associated with the public account and the like in accordance with the type of the preliminary inspection service.

After completing the preliminary inspection permission setting process, each tenant transmits preliminary inspection service permission to the real estate manager side device 8 such that the preliminary inspection service permission setting is completed (S402). With respect to this preliminary inspection service permission, as a timing to start communication, it is possible to appropriately set an immediate start timing when desired, or a start timing by designating a preliminary inspection viable time/period. Receiving the preliminary inspection service permission, the real estate manager side device 8 performs the authentication process of the tenant (S502). This authentication process can be performed only by confirming the service account (user ID and the like) and the password which are registered in the initial registration procedure for the communication service.

Then, environment settings of the preliminary inspection service are performed in accordance with the contents of the permission given by the tenant (S503). This environment settings include a setting of access permission to the camera robot 61 located in the real estate property such that the communication access to the camera robot 61 is restricted by this setting. Specifically, the access to the camera robot 61 is restricted on the basis of the key information possessed by the tenant, and the access restricted by the tenant includes the access from the communication service provider side device 7 and the real estate manager side device 8. Namely, unless the tenant permits, even the communication service provider side device 7 or the real estate manager side device 8 cannot access the camera robot 61.

After completing the environment settings of the preliminary inspection service, the tenant side device waits for access from other users desiring to purchase the real estate property and so forth. The access from preliminary inspection wishers can be done not only from the tenant side device but also from the browser function of an information processing terminal such as a smartphone or a general personal computer through the Internet. In this example, the preliminary inspection service request is transmitted from a general information processing terminal (S601). Receiving the preliminary inspection service request from a general prospective tenant (S504), the real estate manager side device 8 delivers real estate property information including a list of real estate properties which can be preliminary inspected (S504).

A preliminary inspection wisher receiving the real estate property information can refer to the real estate property list (S602) and select a real estate property which is included in the list and can be inspected (S603). In this case, it is assumed that the preliminary inspection wisher selects the real estate property of the tenant A. Receiving the selection of the real estate property of the tenant A, the real estate manager side device 8 transmits a preliminary inspection service start request to the tenant side device 41 of the tenant A (S506). Receiving the preliminary inspection service start request (S403), the tenant A transmits approval to the real estate manager side device 8 as preliminary inspection approval (S404). Receiving the preliminary inspection approval from the tenant A (S507), the real estate manager side device 8 calls the preliminary inspection wisher by transmitting connection permission, and the preliminary inspection wisher receiving the connection permission (S604) performs a start process to start the preliminary inspection service (S508). In the case where a communication viable time is set, this calling is performed when the conversation viable time arrives. Then, after the face-to-face communication is finished (S509), the real estate manager side device 8 records the conversation time, period and the like of the face-to-face communication as service execution results and the service history in the database together with information about pairing of the tenant and the preliminary inspection wisher of the face-to-face communication (S510).

(2-2) Preliminary Inspection after the Tenant Vacated the Real Estate Property

Figure 8:
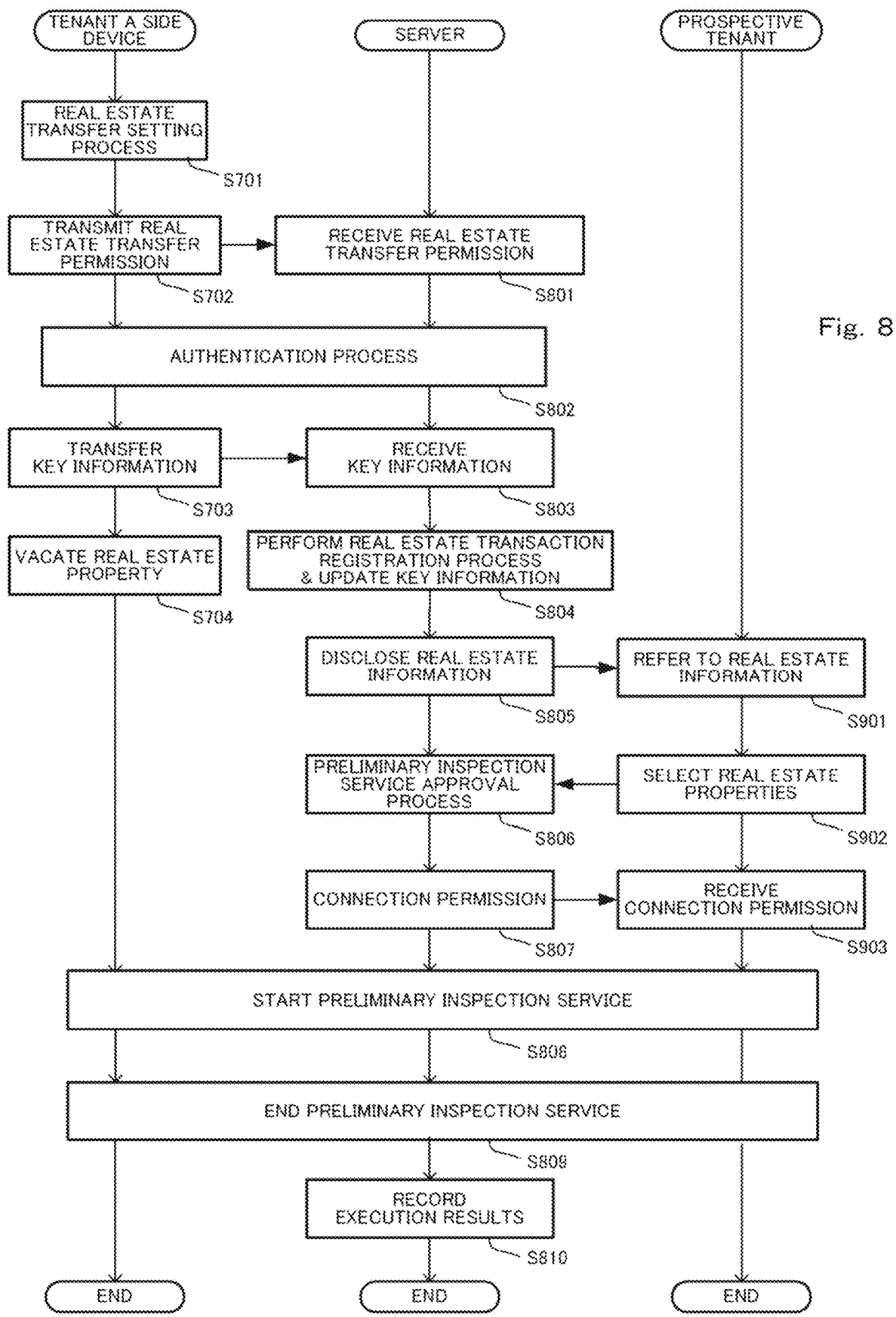
FIG. 8 is a sequence diagram for showing the operation of the preliminary inspection service by a real estate manager in accordance with the first embodiment.

FIG. 8 is a sequence diagram for showing the operation of the preliminary inspection service after vacating the real estate property. Incidentally, this example is described in the case where the preliminary inspection service is provided by a real estate intermediary agent for a prospective tenant after the tenant A vacated the real estate property. As shown in FIG. 8, when transferring the real estate property by selling or moving from the real estate property, first, the tenant A currently living in the real estate property performs a real estate transfer setting process (S701). After completing the real estate transfer setting process, the tenant A transmits real estate transfer permission to the real estate manager side device 8 (S702). Receiving this real estate transfer permission (S801), the real estate manager side device 8 performs an authentication process with the tenant side device 41 for transferring the real estate property (S802), and performs setting for transferring the real estate property. After completing the authentication process between the real estate manager side device 8 and the tenant side device 41, the key information is transferred from the tenant A to the real estate manager side device 8 (S703). After transferring this key information, the tenant A vacates the real estate property (S704).

After receiving the key information in step S803, the real estate manager side device 8 performs a real estate transaction registration process (S804). This real estate transaction registration process is a process to register that the real estate property 3 is currently not occupied by a tenant as an object of transaction for sale and rent, and to notify conditions for sale and rent. After the real estate transaction registration process is completed, the key information is updated. When the key information is updated, the ownership of the real estate property 31 which belonged to the tenant A is transferred to a real estate intermediary agent who performs a real estate transaction instead of the tenant. The right to operate the tenant side device 41 of the real estate property 3 is also transferred by this process of transferring and updating the key information. The right to operate the tenant side device 41 is transferred by rewriting the authentication information of the tenant side device 41. The real estate information about the real estate property having been registered for real estate transaction is disclosed on Web and the like through which prospective tenants can refer to the real estate information through Web (S901).

Then after completing the update of the key information in the real estate manager side device 8, the preliminary inspection wisher can receive the preliminary inspection service. The preliminary inspection wisher receiving real estate information can refer to a list of real estate properties and select properties from real estate properties which can be preliminary inspected from the list (S902). In this case, it is assumed that the preliminary inspection wisher selects the real estate property 31 of the former tenant A. After selection of this real estate property 31, the preliminary inspection service is started (S807) by transmitting connection permission to the preliminary inspection wisher to permit connection and performing a start process by the preliminary inspection wisher who has received the connection permission (S903). In the case where a communication viable time is set, calling is performed when the conversation viable time arrives. Then, after the face-to-face communication is finished (S808), the real estate manager side device 8 records the conversation time, period and the like of the face-to-face communication as service execution results and the service history in the database together with information about pairing of the tenant and the preliminary inspection wisher of the face-to-face communication (S809).

(3) Security Record Service

The security record service is a service to periodically, continuously or at the time of incidents, record an evidence of crime prevention performance, so as not to be falsified, by using the camera robot 61 and a crime prevention camera to image situation of a trouble which happens at an opening site, e.g., visit of a suspicious person to an entrance and invasion from a window. For example, image records are collected and accumulated, so as not to be falsified, by imaging an entrance door from the inside of the entrance at such an angle that an intruder through the entrance door is included in the image.

The image record accumulated as the execution result of this security record service is time-sequentially linked with information about the tenants having occupied the real estate property and accumulated as history data. The execution result including the image record is analyzed in correlation with information about the tenants included in the history data. When transferring the ownership of the real estate property, this analysis result is added to the deed data together with the history data including the image record.

Effect/Action

In accordance with the embodiment as has been discussed above, communication among tenants is promoted through the face-to-face communication service by the use of face-to-face communication with a video telephone between real estate properties in which the present system is installed. For example, it is possible to provide opportunities for English conversation by connecting children's rooms of families of different languages, e.g., a Japanese family and a Westerner family, and utilize a variety of face-to-face services such as seeking friends among tenants, nursing care for elderly person, medical diagnosis and so forth.

In this case, the information about tenants is performed through public accounts and public keys associated with the public accounts so that the personal information of tenants can be concealed, and that it is possible to provide credit on the basis of the history of an individual tenant and a real estate transaction history. As a result, in accordance with the present embodiment, it is possible to attain balance between convenience for performing operation management of real estate properties and privacy protection of tenants, and enhance the added value of the real estate properties.

Furthermore, in accordance with the present embodiment, for executing a security record service for recording images of opening sites such as an entrance door, a window and the like with the camera robot 61 and crime prevention cameras, it is possible to collect and store the images as performance information about the crime prevention state of the real estate property and provide evidence for objectively evaluating security, safety and the like.

Second Embodiment

Figure 9:
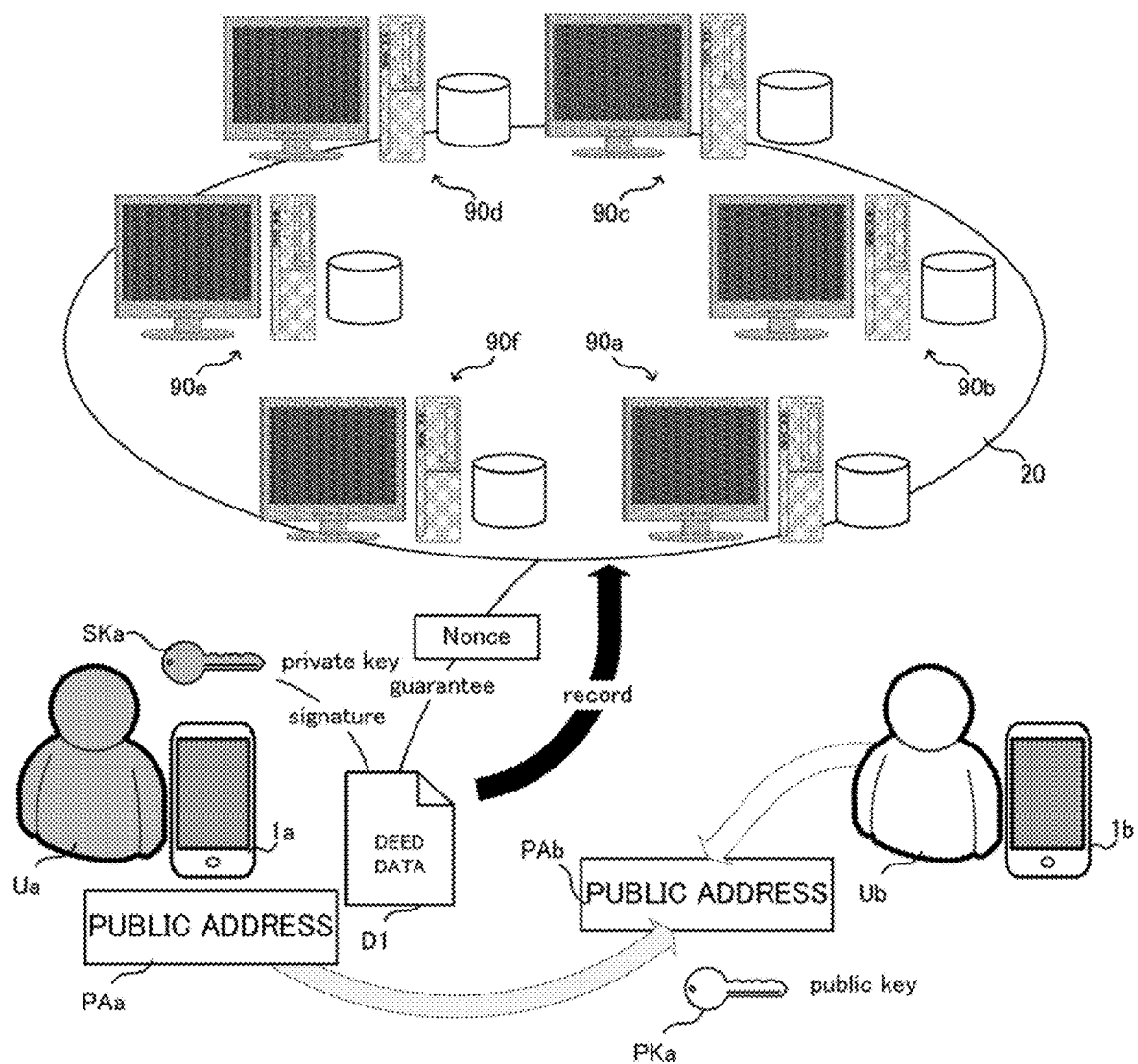
FIG. 9 is a schematic representation showing the overall configuration of a real estate management system in relation to real estate transactions in accordance with a second embodiment.
Figure 10:
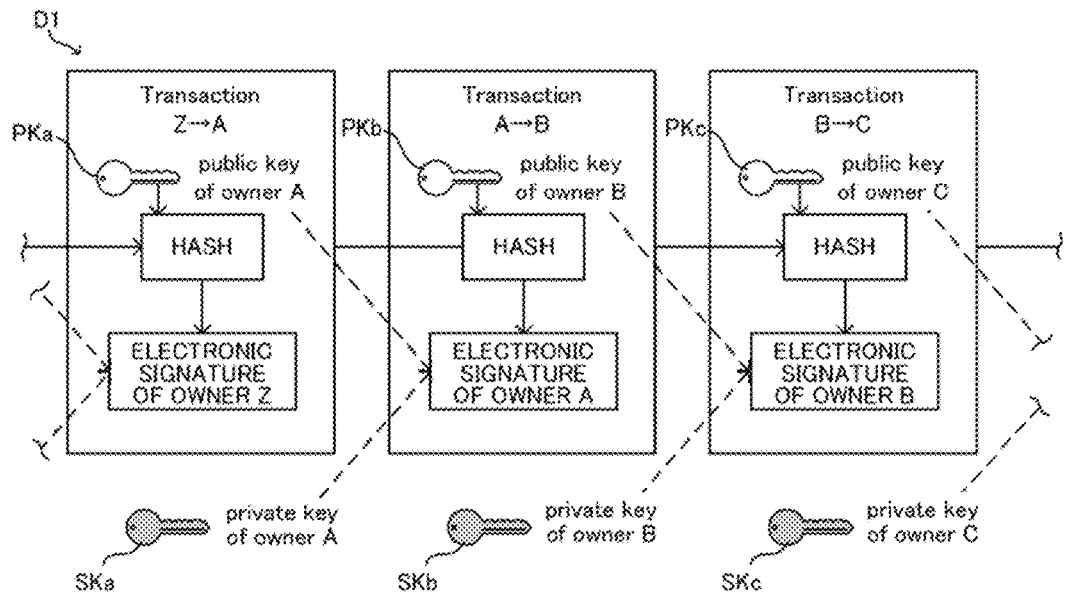
FIG. 10 is an explanatory view for showing the block chain of the real estate management system in accordance with the second embodiment.
Figure 11:
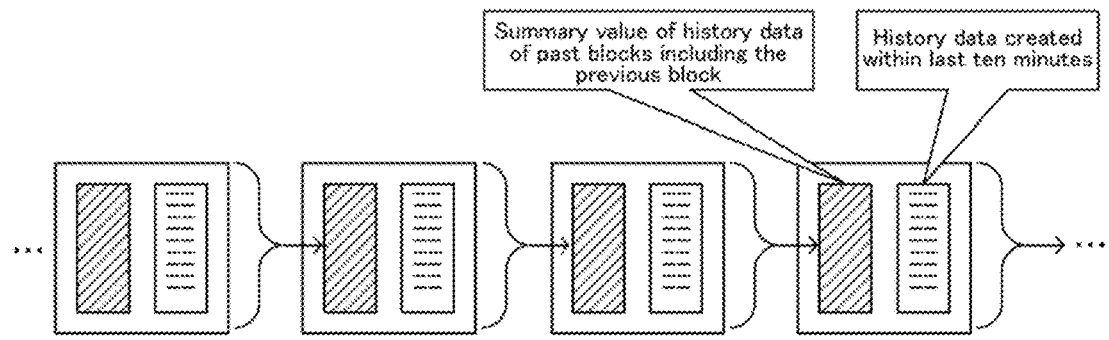
FIG. 11 is an explanatory view for showing the block chain of the real estate management system in accordance with the second embodiment.
Figure 12:
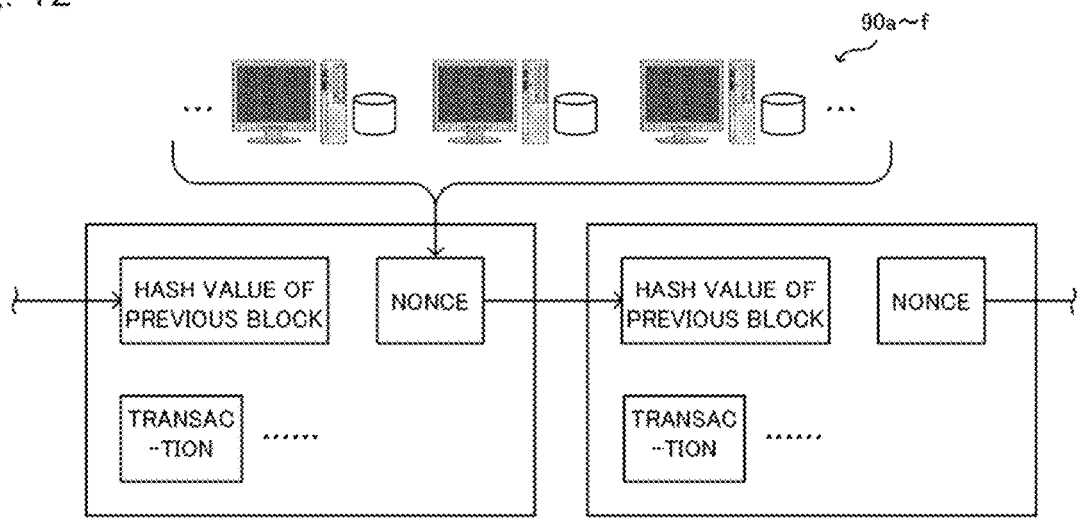
FIG. 12 is an explanatory view for showing the block chain of the real estate management system in accordance with the second embodiment.

Next, a second embodiment of the present invention will be explained. The present embodiment is characterized in that a distributed database system is employed for the guarantee system in accordance with the first embodiment as described above. FIG. 9 is a schematic representation showing the overall configuration of a system in accordance with the present embodiment. FIG. 10 through FIG. 12 are explanatory views for showing a block chain in accordance with the present embodiment. Meanwhile, in the case of the present embodiment, like reference numbers indicate functionally similar elements as the above embodiment unless otherwise specified, and therefore no redundant description is repeated.

(System Configuration)

As shown in FIG. 9, when performing a deed data transaction, the real estate management system 100 in accordance with the present embodiment issues a public key PKa and a private key SKa on the basis of a public key cryptographic system.

The real estate management system 100 generates a public address PAa from the issued public key PKa. This public address PAa is used to indicate an assignee or an assignor of a real estate transaction agreement. On the other hand, the private key SKa is used to generate the electronic signature of a transaction involving the public address PAa as a payment source.

The real estate transaction in accordance with the present embodiment is performed between two nodes of a P2P (Peer-to-Peer) network 20 (in this case, between users Ua and Ub). The transaction information is broadcasted to and shared by the nodes 90a to 90f of the P2P network 20. Thus, a transaction history database (block chain as described below) is formed on the P2P network 20 as a distributed database to store the transaction history of real estate transactions.

In the case of the present embodiment, when the deed data D1 is rewritten through the real estate manager side device 8, this transaction history database is used as this distributed database to perform, approve and manage a real estate transaction agreement. An intermediary agent of the real estate transaction (hereinafter referred to also as a "real estate agent") generates a public address PA3 unique to the real estate property 3 and relays transfer of the deed data D1 to mediate a transaction between an assignor and an assignee.

Then, the parties of the transaction (the assignor and the assignee) temporarily receives the real estate property 3 by transferring the deed data D1 to the public address PA3 unique to the real estate property 3 from the current tenant Ua by the use of the real estate management system 100, and the deed data D1 is further transferred to the prospective tenant Ub from the public address PA3 to establish the sales agreement of the real estate property 3 between the user Ua and the user Ub.

By this process, the user Ub who is the assignee can receive the deed data D1 by own public address PAb to be able to refer to the service history associated with this public address PA3 and make use of services. Incidentally, this public address can be issued by the real estate manager side device 8 or the communication service provider side device 7, or alternatively by an application of the smartphone 1, or a server of a service management institution or a financial institution.

Then, with reference to FIG. 10 through FIG. 12, the detailed transaction mechanism of the electronic crypto currency will be specifically explained. FIG. 10 shows an example of a transaction relating to an electronic cryptographic deed contained in deed data. FIG. 11 and FIG. 12 show an example of part of a transaction history (block chain) of the electronic cryptographic deed.

The deed data of the electronic cryptographic deed is defined as a chain of successive electronic signatures shown in FIG. 10 as an example. When the owner of deed data D1 transfers this deed data D1 to the next owner, the owner of the deed data D1 electronically signs, with own private key, the hash value of the previous transaction and the hash value of the public key of the next owner and adds the electronic signature to the deed data D1. Incidentally, the hash value is calculated by a one-way hash function such as SHA-256 and RIPEMD-160.

FIG. 10 shows a transaction scenario as a specific example in which deed data is transferred from an owner Z to an owner A, then from the owner A to an owner B, and from the owner B to an owner C. In this case, when the deed data is transferred from the owner A to the owner B, the owner A electronically signs, with the private key of the owner A, the hash value of the transfer transaction from the owner Z to the owner A and the hash value of the public key of the owner B who is the next owner, and adds the electronic signature to the deed data.

The owners of the deed data of this and subsequent transactions including the owner B can determine whether or not this transaction is falsified by decoding the electronic signature with the public key of the owner A and verifying the decoded value of the electronic signature with the hash value of the transfer transaction from the owner Z to the owner A and the hash value of the public key of the owner B.

Likewise, when the deed data is transferred from the owner B to the owner C, the owner B electronically signs, with the private key of the owner B, the hash value of the transfer transaction from the owner A to the owner B and the hash value of the public key of the owner C who is the next owner, and adds the electronic signature to the deed data. It is thereby possible to determine whether or not the transfer transaction from the owner B to the owner C is falsified.

The deed data of each real estate property can be defined as such a chain of successive electronic signatures. In this case, the hash value of a public key is a public address. Namely, the deed data saved by this public address can be transferred only by a person who can generate an electronic signature on the real estate transaction relating to the transfer from this public address, i.e., only by a person possessing the private key corresponding to this public address. Because of this, generally speaking, the private key is concealed so as not to be leaked. Incidentally, the deed data is saved by the public address associated with the current owner.

On the other hand, since it is impossible only with this electronic signature to verify multiple use (multiple transfer) of the deed data by someone of the past owners of this deed data, in the case of the mechanism of the electronic cryptographic deed of the present embodiment, such multiple use is prevented by the use of a block chain shown in FIG. 11 and FIG. 12 as an example.

As illustrated in the example of FIG. 11 and FIG. 12, each block contained in the deed data stores a plurality of transactions, a nonce and the hash value of the previous block. The nonce is a value discovered as a result of a proof of work. The block, a nonce of which is discovered, is concatenated to the tail of a block chain by the node (miner) of nodes (miners) 90a to 90f having first discovered the nonce as an approver to update the block chain. By this process, an integrated transaction history is recorded in the block chain which is shared by the nodes 90a to 90f participating the P2P network 20 so that the integrated transaction history can be shared by the entirety of the P2P network 20. Namely, this block chain serves as the transaction history database 901 and the key information database 902 of the first embodiment as described above. In the case of the present embodiment, the electronic cryptographic deed based on the public key cryptographic system makes use of this mechanism to perform transactions of the deed data.

In this case, the proof of work is a mechanism to prevent falsification of the deed data by malicious hacking or the like, and defined as a piece of data (value) which has to be calculated or a system thereof to authenticate each real estate transaction. The present embodiment utilizes a hash function as a means for calculating a nonce. In an actual real estate transaction approval operation, as described above, each real estate transaction unit (block) includes a nonce which is a random variable in addition to transaction information such as a sender and information identifying a real estate property. The proof of work is used to generate a hash value starting from a predetermined number of succeeding "0" (the predetermined number of succeeding "0" with remaining arbitrary data). The proof of work is performed to approve a transaction by calculating a hash value while incrementing the nonce as an exhaustive search. In this case, since it is impossible to calculate the nonce value from the hash value, calculation has to be carried out in a brute-force search fashion.

The approver of this proof of work is called as a miner, and the approval operation is called as mining. The approver receives electronic money or the like in reward for finding the nonce from the fee paid as a real estate transaction commission. In the case of the present embodiment, for the purpose of preventing falsification of the deed data, the proof of work is designed such that this calculation requires about 10 minutes. Since the falsification of the deed data means that transaction data is falsified, the required proof of work changes to necessitate recalculation.

It is important here that a block includes past transaction data. If it is attempted to falsify transaction data, subsequent blocks must be recalculated so that, since there are a number of "good-willed" calculators besides "malicious" attackers and falsifiers, the recalculation speed cannot pace with the calculation speed of new transaction approval so that falsification becomes very difficult. As has been discussed above, the proof of work plays a role as the basis of security in the real estate transactions by the use of deed data.

Incidentally, the approval request through proof of work and the counter service of paying rewards and the like may be performed by the real estate manager side device 8 or the communication service provider side device 7, or a server of a service management institution or a financial institution.

(Real Estate Transfer Transaction Operation)

The real estate transfer transaction method in accordance with the present embodiment can be provided by operating the real estate transaction system as explained above. Incidentally, the procedure steps will be explained below simply as an example, and can be modified as much as possible. Also, with respect to the procedure steps as explained below, it is possible to omit, replace and add some steps readily in accordance with the embodiment.

Figure 13:
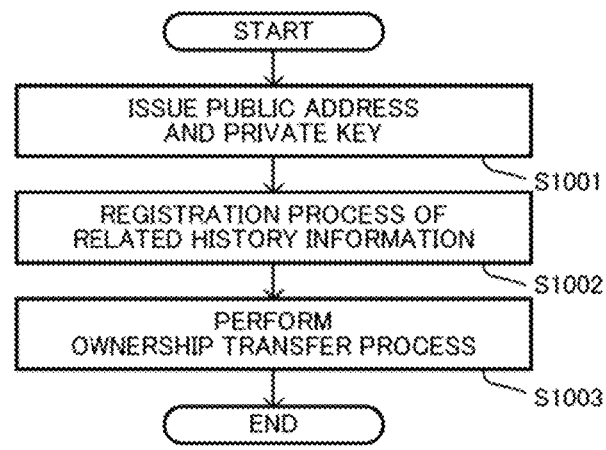
FIG. 13 is an explanatory view for showing an example of the procedure of transferring a real estate property by the real estate transaction system in accordance with the second embodiment.
Figure 14:
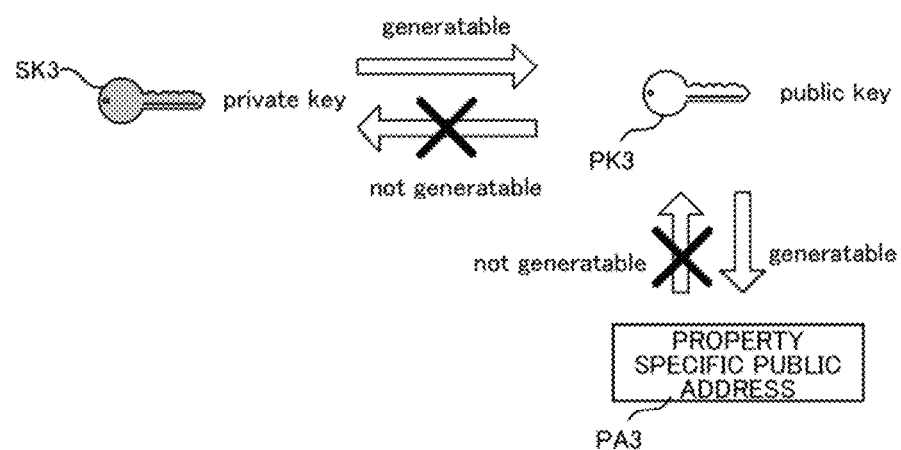
FIG. 14 is an explanatory view for showing an example of the relationship between a public key and a private key in the real estate transaction system in accordance with the second embodiment.

Next, with reference to FIG. 13 to FIG. 15, an operation example of a real estate transaction by the use of an electronic cryptographic deed will be explained. FIG. 13 is an explanatory view for showing an example of the procedure of the real estate transaction system in accordance with the present embodiment when transferring a real estate property, and FIG. 14 shows an example of the relationship between a public key and a private key in accordance with the present embodiment. Also, FIG. 15 is an explanatory view for showing an example of the procedure performed when transferring a real estate property. Incidentally, the procedure steps will be explained below simply as an example, and can be modified as much as possible. Also, with respect to the procedure steps as explained below, it is possible to omit, replace and add some steps readily in accordance with the embodiment.

In the case of the present embodiment, the mechanism of the electronic cryptographic deed based on the distributed database according to the present embodiment is used in step S804 of the first embodiment as described above in which are performed the real estate transaction registration process and the update key information. In this case, an example will be explained in the case where the tenant Ua sells the real estate property 3 to the prospective tenant Ub through a real estate manager. This real estate sales transaction includes, as illustrated in FIG. 13, a step S1001 of issuing a public address and a private key, a step S1002 of performing registration of related service history information, and a step S1003 of performing an ownership transfer process.

At first, in step S1001, the real estate manager side device 8 serves as an address issuing unit which issues a pair of a property specific public address PA3 and a private key SK3 corresponding to the public address PA3 unique to the real estate property 3. Specifically, as illustrated in FIG. 14 showing an example, the real estate manager side device 8 generates the private key SK3 corresponding to the public address unique to the real estate property 3 by the use of a random number generator or the like based on the public key cryptographic system. The random number generator may be incorporated in the guarantee system cooperation unit 805a as a program. This private key SK3 is used as described above to generate an electronic signature on the transaction (in this case, sale to the prospective tenant Ub from a real estate intermediary agent) with the paired property specific public address PA3 as a real estate transfer source.

Next, for example, the real estate manager side device 8 generates the public key PK3 from the private key SK3 on the basis of an electronic signature algorithm such as the Elliptic Curve DSA (Elliptic Curve Digital Signature Algorithm, ESDSA). The public key PK3 and the private key SK3 are generated as a key pair of a public key cryptographic system. In the nature of the public key cryptographic system, while the public key PK3 can be generated from the private key SK3, the private key SK3 cannot be generated from the public key PK3 from the view point of the computational complexity. Namely, while the private key SK3 cannot be identified from the public key PK3, the public key PK3 can be identified from the private key SK3. Incidentally, the electronic signature algorithm as used is not limited to the Elliptic Curve DSA, but an appropriate algorithm can be selected in accordance with the implementation.

Next, the real estate manager side device 8 generates the property specific public address PA3 from the public key PK3 by applying a one-way hash function such as SHA-256 and RIPEMD-160 to the public key PK3. For example, the real estate manager side device 8 can generate the property specific public address PA3 by applying SHA-256 to the public key PK3 twice. Namely, this property specific public address PA3 is a hash value of the public key which is used for signature of transactions as described above, and used for identifying the transfer destination and source of an electronic cryptographic deed. Incidentally, since the property specific public address PA3 is generated by the use of a one-way hash function, as illustrated in FIG. 14, while the property specific public address PA3 can be generated from the public key PK3, the public key PK3 cannot be generated from the property specific public address PA3.

In next step S1002, the service history data (related history information) associated with the real estate property 3 such as execution history of the face-to-face communication service and the security record service, which is provided while the tenant Ua is occupying the real estate property 3, is registered in association with the property specific public address PA3 which is generated in step S1001. Specifically, as illustrated in FIG. 15 as an example, the service history data is disclosed, in association with the property specific public address PA3, as execution history recorded by the communication service provider side device 7 including the communication record of the face-to-face communication service and the recorded images of the security record service, and as the individual property history D2 for the real estate property 3 such as recommendation/matching results. This individual property history D2 can freely be referred to as long as the public key PK3 corresponding to the property specific public address PA3 is acquired.

Thereafter, in step S1003, the real estate manager side device 8 performs the transaction to transfer the ownership corresponding to the property specific public address PA3 which is generated in step S1001 in accordance with predetermined property transfer conditions. Then, after completing the transfer process, the real estate manager side device 8 terminates the process according to the present operation example.

In accordance with the present embodiment, the electronic cryptographic deed is transferred by the use of an application which is executed on the terminal device 1a. For this purpose, in FIG. 15, the application for performing the electronic cryptographic deed mechanism is installed also in the guarantee system cooperation unit 805a of the real estate manager side device 8. This application controls a plurality of property specific public addresses managed by a real estate intermediary agent.

While the real estate property 3 belongs to the tenant Ua as a resident, the deed data D1 is associated with the public address PAa unique to the tenant Ua or the private key SKa paired with the public address PAa in the terminal device 1a of the tenant Ua. When transferring the real estate property 3, the user Ua can transfer the deed data D1 from the public address PAa (transfer source) to the property specific public address PA3 (transfer destination) generated in step S1001 by a real estate intermediary agent.

On the other hand, as illustrated in FIG. 15, the prospective tenant Ub desiring to be a resident of the real estate property 3 acquires the public key PK3 associated with the real estate property 3 by the use of own terminal device 1b, and can refer to the real estate information associated with the property specific public address PA3 of the real estate property 3 and the individual property history related thereto.

Specifically, an application is installed in the user terminal 1b of the user Ub to manage the public address PAb possessed by the user Ub. The public address PAb is associated with own private key SKb by which the deed data D1 can further be transferred from own public address PAb to another user. Namely, with the private key SKb, the user Ub can freely utilize the deed data D1 stored in association with the public address PAb. In this case, the user Ub accepts the deed data D1 which is transferred from the property specific public address PA3 to the public address PAb by the use of the application in the user terminal 1b.

Actions/Effects

In accordance with the present embodiment as described above, since a distributed database mechanism is employed as a guarantee system, a single facility for performing strong system operation management need not be provided for each real estate agent, and the distributed database mechanism serves to secure commonization of databases for information cooperation when information is exchanged among agents, and advanced security countermeasures of privacy protection and data falsification, so that it is possible to suppress equipment and operation costs.

DESCRIPTION OF REFERENCE SIGNS 1 (11, 12, 1a, 1b) . . . smartphone
2 . . . communication network
3 . . . real estate property
4 . . . tenant side device
6 . . . camera robot
7 . . . service provider side device
8 . . . real estate manager side device
9 . . . guarantee system
31, 32 . . . real estate property
41, 42 . . . tenant side device
61, 62 . . . camera robot
100 . . . real estate management system
402c . . . operation regulation unit
402d . . . external access control unit
704, 804 . . . authentication unit
705 . . . analysis unit
706 . . . service execution unit
707 . . . matching execution unit
805 . . . real estate transaction execution unit
904 . . . authentication unit
906 . . . transaction execution unit
D1 . . . deed data
D2 . . . individual property history
PA3 . . . property specific public address
PAa, PAb . . . public address
PK3, PKa, PKb . . . public key

What is claimed is:

1. A real estate management system for managing real estate properties through a communication network, comprising:
an internal imaging unit which images an inside of the real estate property;
a tenant side device which controls communications through the internal imaging unit;
an operation regulation unit which regulates an operation of the tenant side device on the basis of an operation by a tenant of the real estate property;
a service provider side device which is connected to the internal imaging unit through the communication network for controlling a communication service with the internal imaging unit; and
a real estate manager side device which is connected to the internal imaging unit through the communication network for controlling a real estate management service with the internal imaging unit, wherein
the operation regulation unit includes:
an authentication unit which authenticates the tenant on the basis of real-estate deed data which certifies tenantship of the real estate property; and an external access control unit which permits and limits the service provider side device and the real estate manager side device to access the internal imaging unit, the external access control unit is configured to permit the service provider side device and the real estate manager side device to access the internal imaging unit only when a user is authenticated as the tenant by the authentication unit and the user operates the external access control unit to permit the service provider side device and the real estate manager side device to access the internal imaging unit, and the real estate manager side device is configured to acquire the real-estate deed data and transfer an ownership of the real estate property by changing the tenant certified by the real-estate deed data.

2. The real estate management system of claim 1 wherein the real estate manager side device performs a preliminary inspection service through the internal imaging unit in accordance with the authentication result by the authentication unit of the tenant and the authorization operation of the tenant.

3. The real estate management system of claim 1 further comprising:

the service provider side device can be connected to the internal imaging units of a plurality of tenants for performing a face-to-face communication service through the internal imaging units by connecting the tenant side devices of the tenants with each other in accordance with the authentication result by the authentication unit of each tenant and the authorization operation of the each tenant.

4. The real estate management system of claim 1 wherein the internal imaging unit is installed to image an opening site including at least either an entrance or a window of the real estate property from the insides of the real estate property, and wherein the service provider side device is provided with a service execution unit which executes a security record service for recording an image of the opening site with the internal imaging unit in accordance with the authentication result by the authentication unit of the tenant and the authorization operation of the tenant.

5. The real estate management system of claim 3 further comprising:

an accumulating unit which accumulates history data obtained by time sequentially connecting information about successive tenants having occupied the real estate property provided with the authentication unit;

an analysis unit which accumulates information about execution results of the face-to-face communication service, and analyzes correlation between the history data and the execution results of the face-to-face communication service; and a matching execution unit which selects participants of the face-to-face communication service and performs matching among the tenants.

6. The real estate management system of claim 3 further comprising:

an accumulating unit which accumulates history data obtained by time sequentially connecting information about successive tenants having occupied the real estate property and execution results of the service execution unit;

an analysis unit which analyzes correlation between the history data and the execution results;

a cooperation unit which cooperates with a guarantee system which guarantees legitimacy of the real-estate deed data, wherein when ownership of the real estate property is transferred, the guarantee system acquires an analysis result from the analysis unit of the service provider side device and adds the acquired analysis result and the history data to the real-estate deed data.

7. The real estate management system of claim 1 wherein the real estate manager side device further comprising:

a cooperation unit which cooperates with a guarantee system which guarantees legitimacy of the real-estate deed data; and a real estate transaction execution unit which performs a transaction of the real estate property on the basis of a guarantee obtained by the cooperation unit.

8. The real estate management system of claim 6 wherein the guarantee system comprising:

an address issuance unit which issues a public address generated from a public key in accordance with a public key cryptographic system for identifying a certain user, and a private key paired with the public key and capable of identifying the public key for use in an electronic signature of a real estate transaction through the public address; and a real estate transaction execution unit which acquires the real-estate deed data to transfer the ownership of the real estate property by adding a public address relating to a new tenant and changing the tenant certified by the real-estate deed data.

9. A non-transitory computer readable medium having stored thereon a real estate management program for use in a system which manages real estate properties through a communication network, and for causing a server device to function as:

an internal imaging unit which images an inside of the real estate property;

a tenant side device which controls communications through the internal imaging unit;

an operation regulation unit which regulates an operation of the tenant side device on the basis of an operation by a tenant of the real estate property;

a service provider side device which is connected to the internal imaging unit through the communication network for controlling a communication service with the internal imaging unit; and a real estate manager side device which is connected to the internal imaging unit through the communication network for controlling a real estate management service with the internal imaging unit, wherein the operation regulation unit includes:

an authentication unit which authenticates the tenant on the basis of real-estate deed data which certifies tenantship of the real estate property; and an external access control unit which permits and limits the service provider side device and the real estate manager side device to access the internal imaging unit, the external access control unit is configured to permit the service provider side device and the real estate manager side device to access the internal imaging unit only when a user is authenticated as the tenant by the authentication unit and the user operates the external access control unit to permit the service provider side device and the real estate manager side device to access the internal imaging unit, and the real estate manager side device is configured to acquire the real-estate deed data and transfer an ownership of the real estate property by changing the tenant certified by the real-estate deed data.

10. The non-transitory computer readable medium of claim 9 wherein
the real estate manager side device performs a preliminary inspection service through the internal imaging unit in accordance with the authentication result by the authentication unit of the tenant and the authorization operation of the tenant.

11. The non-transitory computer readable medium of claim 9 further comprising:
the service provider side device can be connected to the internal imaging units of a plurality of tenants for performing a face-to-face communication service through the internal imaging units by connecting the tenant side devices of the tenants with each other in accordance with the authentication result by the authentication unit of each tenant and the authorization operation of the each tenant.

12. The non-transitory computer readable medium of claim 9 wherein
the internal imaging unit is installed to image an opening site including at least either an entrance or a window of the real estate property from the insides of the real estate property, and wherein
the service provider side device is provided with a service execution unit which executes a security record service for recording an image of the opening site with the internal imaging unit in accordance with the authentication result by the authentication unit of the tenant and the authorization operation of the tenant.

13. The non-transitory computer readable medium of claim 11 further comprising:
an accumulating unit which accumulates history data obtained by time sequentially connecting information about successive tenants having occupied the real estate property provided with the authentication unit;
an analysis unit which accumulates information about execution results of the face-to-face communication service, and analyzes correlation between the history data and the execution results of the face-to-face communication service; and
a matching execution unit which selects participants of the face-to-face communication service and performs matching among the tenants.

14. The non-transitory computer readable medium of claim 11 further comprising:
an accumulating unit which accumulates history data obtained by time sequentially connecting information about successive tenants having occupied the real estate property and execution results of the service execution unit;
an analysis unit which analyzes correlation between the history data and the execution results;
a cooperation unit which cooperates with a guarantee system which guarantees legitimacy of the real-estate deed data, wherein
when ownership of the real estate property is transferred, the guarantee system acquires an analysis result from the analysis unit of the service provider side device and adds the acquired analysis result and the history data to the real-estate deed data.

15. The non-transitory computer readable medium of claim 9 wherein the real estate manager side device comprising:

a cooperation unit which cooperates with a guarantee system which guarantees legitimacy of the real-estate deed data; and
a real estate transaction execution unit which performs a transaction of the real estate property on the basis of a guarantee obtained by the cooperation unit.

16. The non-transitory computer readable medium of claim 14 wherein the guarantee system comprising:
an address issuance unit which issues a public address generated from a public key in accordance with a public key cryptographic system for identifying a certain user, and a private key paired with the public key and capable of identifying the public key for use in an electronic signature of a real estate transaction through the public address; and
a real estate transaction execution unit which acquires the real-estate deed data to transfer the ownership of the real estate property by adding a public address relating to a new tenant and changing the tenant certified by the real-estate deed data.

17. A real estate management method for managing real estate properties through a communication network, comprising:
a tenant side step of installing an internal imaging unit which images an inside of the real estate property, and controlling communications by a tenant side device through the internal imaging unit;
an operation regulation step of regulating an operation of the tenant side device on the basis of an operation by a tenant of the real estate property;
a service provider side step of controlling a communication service with the internal imaging unit by the service provider side device connected to the internal imaging unit through the communication network; and
a real estate manager side step of controlling a real estate management service with the internal imaging unit by the real estate manager side device connected to the internal imaging unit through the communication network, wherein
the operation regulation step
is performed such that the tenant is authenticated by an authentication unit on the basis of real-estate deed data which certifies tenantship of the real estate property; and
includes an external access control step of permitting and limiting the service provider side device and the real estate manager side device to access the internal imaging unit,
the external access control step is performed such that the service provider side device and the real estate manager side device is permitted to access the internal imaging unit only when a user is authenticated as the tenant by the authentication unit and the user operates in the external access control step to permit the service provider side device and the real estate manager side device to access the internal imaging unit, and
the real estate manager side step is performed such that the real-estate deed data is acquired an ownership of the real estate property is transferred by changing the tenant certified by the real-estate deed data.

18. The real estate management method of claim 17 wherein
the real estate manager side device performs a preliminary inspection service through the internal imaging unit in accordance with the authentication result by the authentication unit of the tenant and the authorization operation of the tenant.

19. The real estate management method of claim 17 wherein
the service provider side device can be connected to the internal imaging units of a plurality of tenants, and further comprising:
a step of performing a face-to-face communication service by a service execution unit through the internal imaging units by connecting the tenant side devices of the tenants with each other in accordance with the authentication result by the authentication unit of each tenant and the authorization operation of the each tenant.

20. The real estate management method of claim 17 wherein
the internal imaging unit is installed to image an opening site including at least either an entrance or a window of the real estate property from the insides of the real estate property, and further comprising:
a step of executing a security record service by service execution unit for recording an image of the opening site with the internal imaging unit in accordance with the authentication result by the authentication unit of the tenant and the authorization operation of the tenant.

21. The real estate management method of claim 19 wherein
the authentication unit is provided with an accumulating unit which accumulates history data obtained by time sequentially connecting information about successive tenants having occupied the real estate property provided with the authentication unit,
the service provider side step comprising:
an analysis step of accumulating information about execution results of the face-to-face communication service, and analyzing, by an analysis unit, correlation between the history data and the execution results of the face-to-face communication service; and
a matching execution step of selecting participants of the face-to-face communication service and performing matching among the tenants, by a matching unit.

22. The real estate management method of claim 19 further comprising:
an analysis step of analyzing correlation between the execution results and history data accumulated by time sequentially connecting information about successive tenants having occupied the real estate property and execution results of the service execution unit, and wherein
in the real estate manager side step, when ownership of the real estate property is transferred, a guarantee system which guarantees legitimacy of the real-estate deed data acquires an analysis result from the analysis unit of the service provider side device and adds the acquired analysis result and the history data to the real-estate deed data.

23. The real estate management method of claim 17 wherein the real estate manager side step comprising:
a cooperation step of cooperating with a guarantee system which guarantees legitimacy of the real-estate deed data by a cooperation unit; and
a real estate transaction execution step of performing, by a real estate transaction execution unit, a transaction of the real estate property on the basis of a guarantee obtained by the cooperation unit.

24. The real estate management method of claim 22 wherein
in the real estate manager side step, the guarantee system performs:
an address issuance step of issuing a public address generated from a public key in accordance with a public key cryptographic system for identifying a certain user, and a private key paired with the public key and capable of identifying the public key for use in an electronic signature of a real estate transaction through the public address; and
a real estate transaction execution step of acquiring the real-estate deed data to transfer the ownership of the real estate property by adding a public address relating to a new tenant and changing the tenant certified by the real-estate deed data.

* * * * *